United States Patent
Kon

(10) Patent No.: US 8,320,052 B2
(45) Date of Patent: Nov. 27, 2012

(54) IMAGE FORMING OPTICAL SYSTEM AND IMAGE PICK UP APPARATUS USING THE SAME

(75) Inventor: Toyoki Kon, Hachioji (JP)

(73) Assignee: Olympus Corporation, Tokyo (JP)

( * ) Notice: Subject to any disclaimer, the term of this patent is extended or adjusted under 35 U.S.C. 154(b) by 58 days.

(21) Appl. No.: 13/068,166

(22) Filed: May 3, 2011

(65) Prior Publication Data

US 2011/0279908 A1 Nov. 17, 2011

(30) Foreign Application Priority Data

May 13, 2010 (JP) .................................. 2010-111374

(51) Int. Cl.
*G02B 15/14* (2006.01)
(52) U.S. Cl. ........................................................ 359/686
(58) Field of Classification Search .................... 359/686
See application file for complete search history.

(56) References Cited

U.S. PATENT DOCUMENTS

2006/0268426 A1* 11/2006 Arimoto et al. ............... 359/686

FOREIGN PATENT DOCUMENTS

| JP | 10-020194 | 1/1998 |
| JP | 10-048524 | 2/1998 |
| JP | 2008-191385 | 8/2008 |

* cited by examiner

*Primary Examiner* — William Choi
(74) *Attorney, Agent, or Firm* — Kenyon & Kenyon LLP

(57) ABSTRACT

An image forming optical system includes in order from an object side, a first lens group having a negative refractive power, a second lens group having a positive refractive power, which includes an aperture stop, a third lens group having a negative refractive power, and a fourth lens group having a positive refractive power. The first lens group, in order from the object side, includes a negative sub-group and a positive sub-group. The third lens group is a focusing group which includes only a cemented lens having a convex surface directed toward the object side, of a negative lens and a positive meniscus lens, in order from the object side.

15 Claims, 25 Drawing Sheets

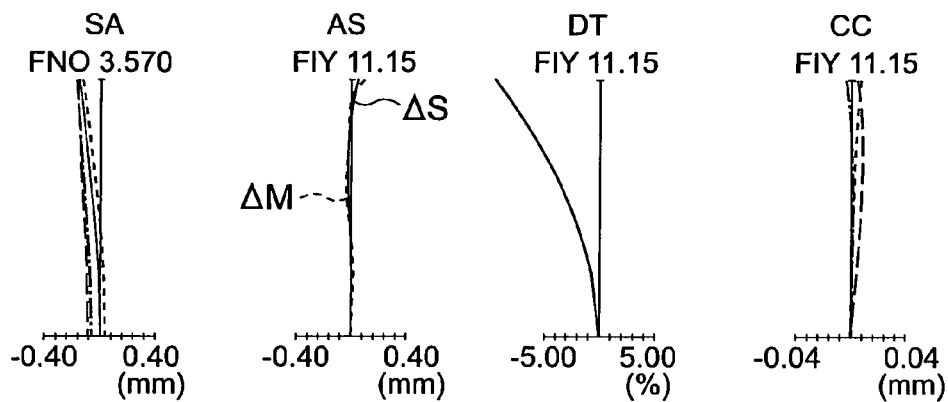
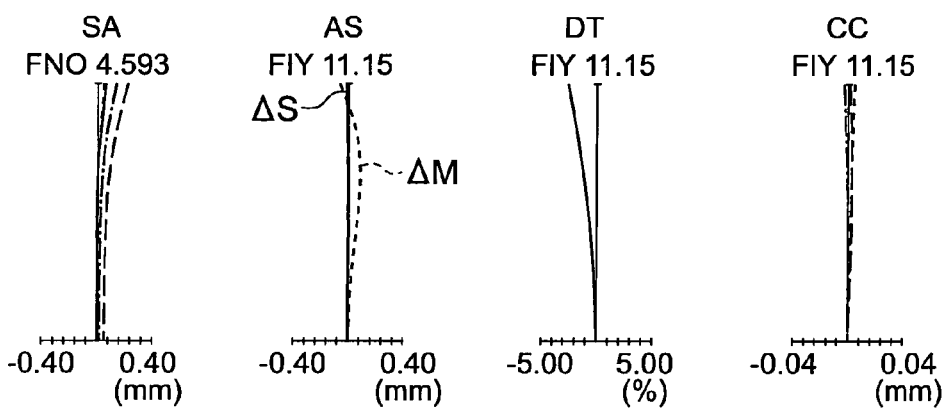
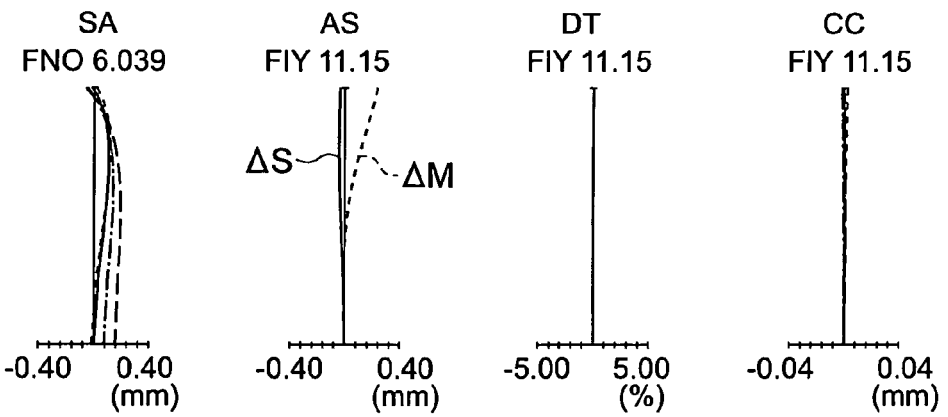

435.84 – – – –
486.13 – · – · –
656.27 - - - -
587.56 ———

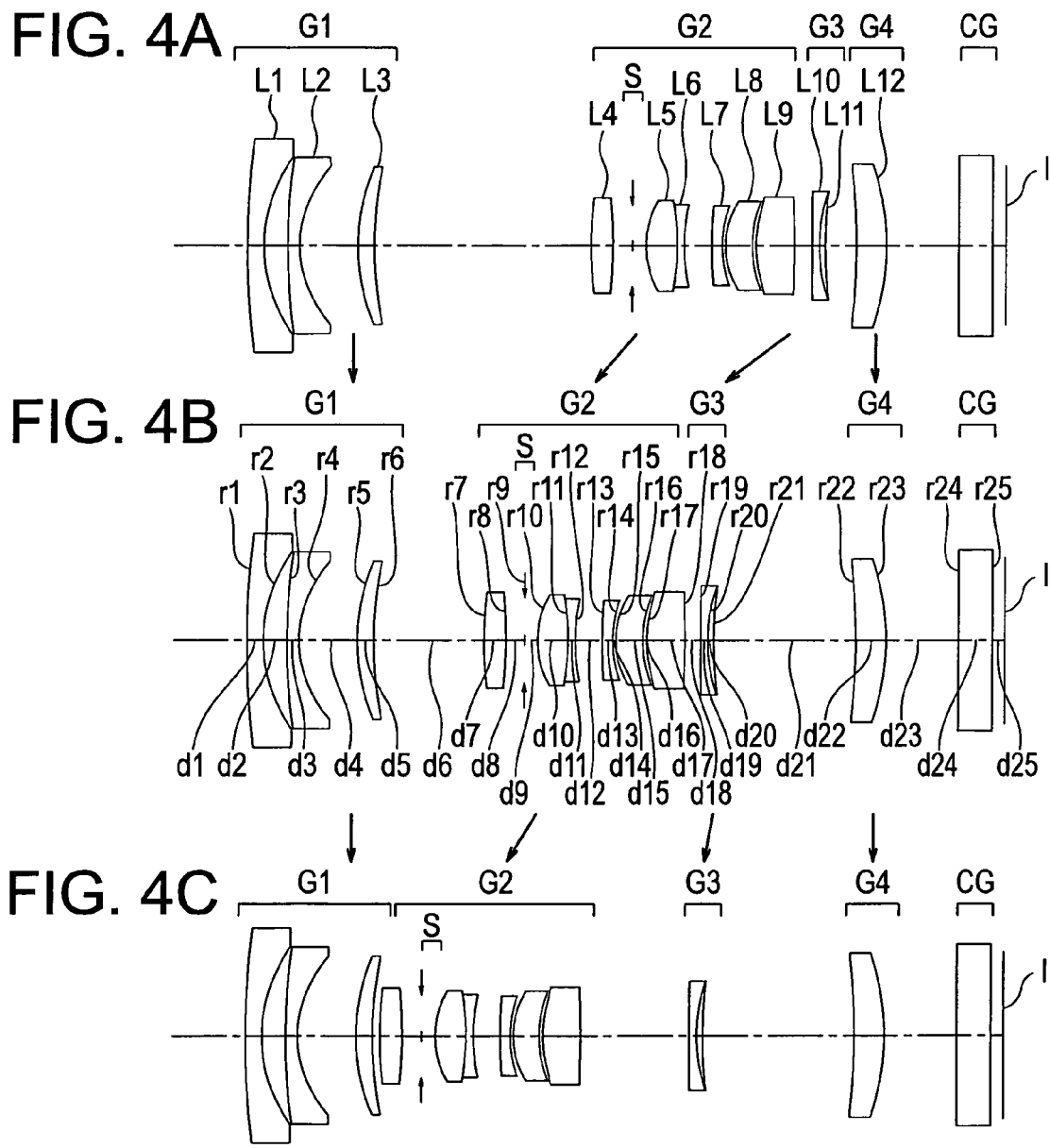

435.84 -----
486.13 —·—·—
656.27 -------
587.56 ———

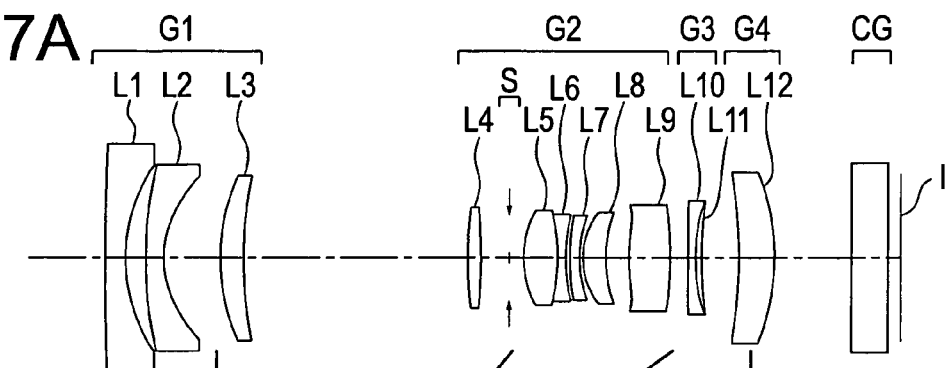
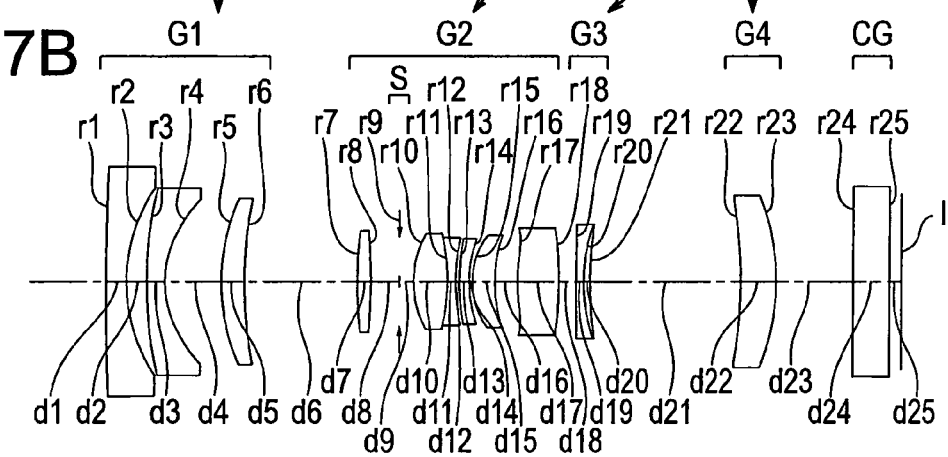
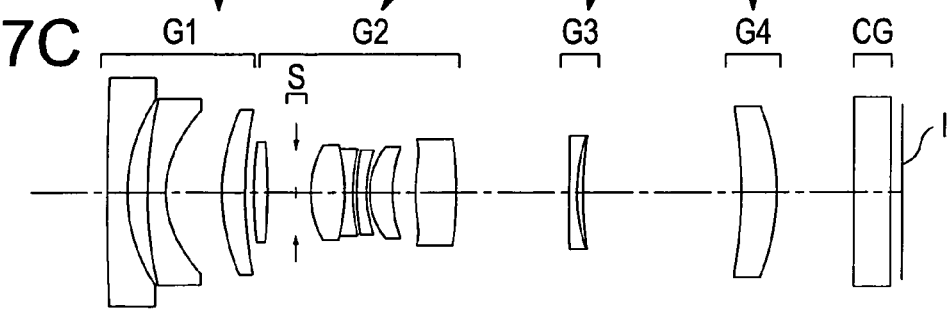

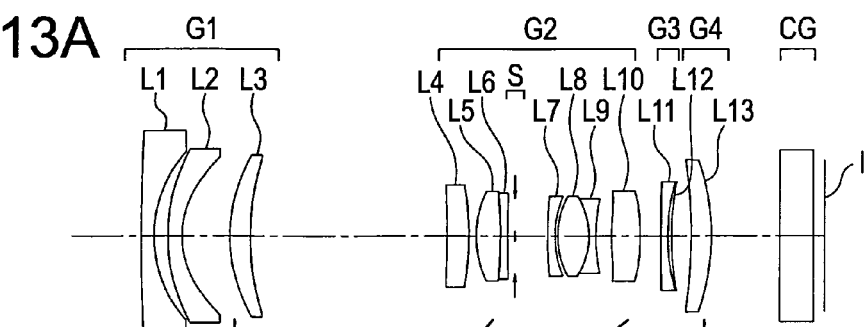
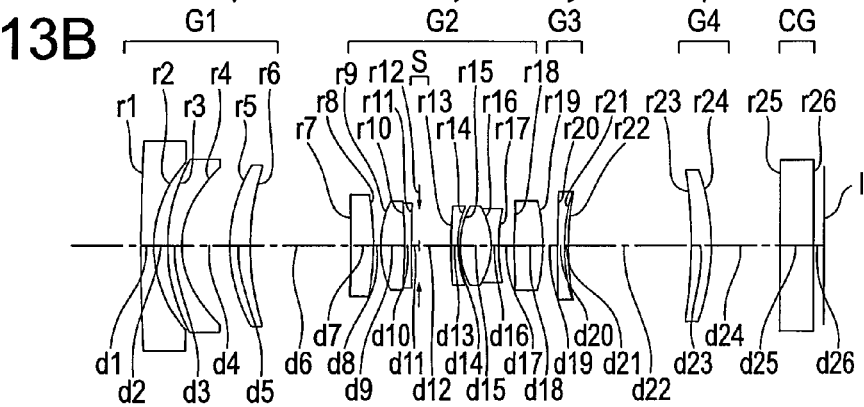
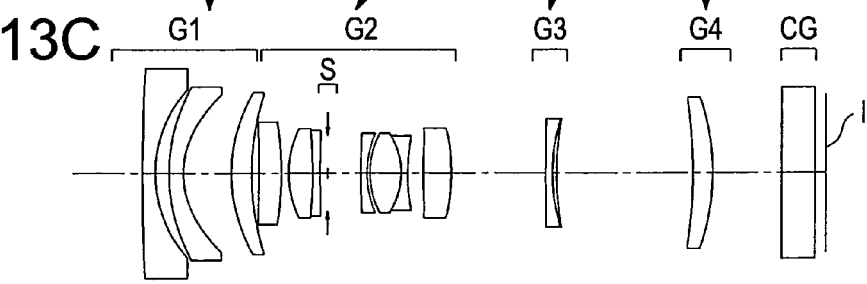

435.84 – – – –
486.13 – · – · –
656.27 - - - - -
587.56 ———

435.84 – – – –
486.13 –·–·–·–
656.27 - - - - -
587.56 ———

IMAGE FORMING OPTICAL SYSTEM AND IMAGE PICK UP APPARATUS USING THE SAME

CROSS-REFERENCE TO RELATED APPLICATION

The present application is based upon and claims the benefit of priority from the prior Japanese Patent Application No. 2010-111374 filed on May 13, 2010; the entire contents of which are incorporated herein by reference.

BACKGROUND OF THE INVENTION

1. Field of the Invention

The present invention relates to an image forming optical system and an image pickup apparatus using the same.

2. Description of the Related Art

In recent years, the popularity of an interchangeable-lens camera such as a single-lens reflex camera in which, an electronic image pickup apparatus such as a CCD (charge coupled device) and a CMOS (complementary metal oxide semiconductor) is used, has been increasing. In an interchangeable lens which is used in the interchangeable-lens camera, making a focusing lens group light-weight and simple, and enabling inner focus by the focusing lens group have been sought. This is because, by making the focusing lens group light-weight and enabling the inner focus for reducing drawing out of the interchangeable lens, it is possible to make it silent at the time of focusing. Accordingly, it is possible to reduce a sound of focusing at the time of still photography, and a sound of focusing which is generated by a frequent focusing movement at the time of video photography, in a case such as of a video photography by the interchangeable-lens camera of recent years in which, a highly defined video-photography function surpassing the conventional digital video camera has been installed.

However, when the focusing lens group is merely made light-weight and simple, it is not possible to prevent deterioration of various aberrations caused due to focusing. For instance, when focusing is carried out by one lens, suppressing fluctuation of aberrations, mainly a chromatic aberration, becomes difficult. Moreover, improving Petzval's sum also becomes difficult. For preventing the deterioration of these aberrations, an arrangement of at least one each of a convex lens and a concave lens, a total of two lenses, or one cemented lens, has been necessary in a conventional focusing group, which has been imposing limitation on making the focusing lens group light-weight.

As a compact image forming optical system of which, an overall length is short, image forming optical systems which include four lens groups namely, a negative lens group (a lens group having a negative refractive power), a positive lens group (a lens group having a positive refractive power), a negative lens group, and a positive lens group as disclosed in Japanese Patent Application Laid-open Publication Nos. Hei 10-48524, Hei 10-20194, and 2008-191385, have been proposed. However, in arrangements in Japanese Patent Application Laid-open Publication Nos. Hei 10-48524, Hei 10-20194, and 2008-191385, it has been extremely difficult to achieve both of making the focusing lens group light-weight and simple, and preventing deterioration of various aberrations caused due to focusing.

SUMMARY OF THE INVENTION

An image forming optical system according to the present invention includes in order from an object side
a first lens group having a negative refractive power,
a second lens group having a positive refractive power, which includes an aperture stop,
a third lens group having a negative refractive power, and
a fourth lens group having a positive refractive power, and
the first lens group, in order from the object side, includes a negative sub-group (a sub-group having a negative refractive power), and a positive sub-group (a sub-group having a positive refractive power), and
the third lens group is a focusing group which includes only a cemented lens having a convex surface directed toward the object side, of a negative lens and a positive meniscus lens, in order from the object side.

An image pickup apparatus according to the present invention includes the abovementioned image forming optical system, and an image pickup element.

BRIEF DESCRIPTION OF THE DRAWINGS

FIG. 1A shows a state at a wide angle end, FIG. 1B shows an intermediate state, and FIG. 1C shows a state at a telephoto end;

FIG. 2A, FIG. 2B, and FIG. 2C are diagrams showing a spherical aberration, an astigmatism, a distortion, and a chromatic aberration of magnification at the time of infinite object point focusing of the image forming optical system according to the first embodiment, where, FIG. 2A shows a state at the wide angle end, FIG. 2B shows an intermediate state, and FIG. 2C shows a state at the telephoto end;

FIG. 3A shows a state at the wide angle end, FIG. 3B shows an intermediate state, and FIG. 3C shows a state at the telephoto end;

FIG. 4A, FIG. 4B, and FIG. 4C are cross-sectional views along an optical axis showing an optical arrangement at the time of infinite object point focusing of an image forming optical system according to a second embodiment of the present invention, where, FIG. 4A shows a state at a wide angle end, FIG. 4B shows an intermediate state, and FIG. 4C shows a state at a telephoto end;

FIG. 5A shows a state at the wide angle end, FIG. 5B shows an intermediate state, and FIG. 5C shows a state at the telephoto end;

FIG. 6A shows a state at the wide angle end, FIG. 6B shows an intermediate state, and FIG. 6C shows a state at the telephoto end;

FIG. 7A, FIG. 7B, and FIG. 7C are cross-sectional views along an optical axis showing an optical arrangement at the time of infinite object point focusing of an image forming optical system according to a third embodiment of the present invention, where, FIG. 7A shows a state at a wide angle end, FIG. 7B shows an intermediate state, and FIG. 7C shows a state at a telephoto end;

FIG. 8A shows a state at the wide angle end, FIG. 8B shows an intermediate state, and FIG. 8C shows a state at the telephoto end;

FIG. 9A shows a state at the wide angle end, FIG. 9B shows an intermediate state, and FIG. 9C shows a state at the telephoto end;

FIG. 10A shows a state at a wide angle end, FIG. 10B shows an intermediate state, and FIG. 100 shows a state at a telephoto end;

FIG. 11A shows a state at the wide angle end, FIG. 11B shows an intermediate state, and FIG. 11C shows a state at the telephoto end;

FIG. 12A shows a state at the wide angle end, FIG. 12B shows an intermediate state, and FIG. 12C shows a state at the telephoto end;

FIG. 13A, FIG. 13B, and FIG. 13C are cross-sectional views along an optical axis showing an optical arrangement at the time of infinite object point focusing of an image forming optical system according to a fifth embodiment of the present invention, where, FIG. 13A shows a state at a wide angle end, FIG. 13B shows an intermediate state, and FIG. 13C shows a state at a telephoto end;

FIG. 14A shows a state at the wide angle end, FIG. 14B shows an intermediate state, and FIG. 14C shows a state at the telephoto end;

FIG. 15A shows a state at the wide angle end, FIG. 15B shows an intermediate state, and FIG. 15C shows a state at the telephoto end;

FIG. 16A shows a state at a wide angle end, FIG. 16B shows an intermediate state, and FIG. 16C shows a state at a telephoto end;

FIG. 17A shows a state at the wide angle end, FIG. 17B shows an intermediate state, and FIG. 17C shows a state at the telephoto end;

FIG. 18A shows a state at the wide angle end, FIG. 18B shows an intermediate state, and FIG. 18C shows a state at the telephoto end;

FIG. 25A is a front view of a mobile telephone 400, FIG. 25B is a side view of the mobile telephone 400, and FIG. 25C is a cross-sectional view of a photographic optical system 405.

DETAILED DESCRIPTION OF THE INVENTION

Figure 1A:
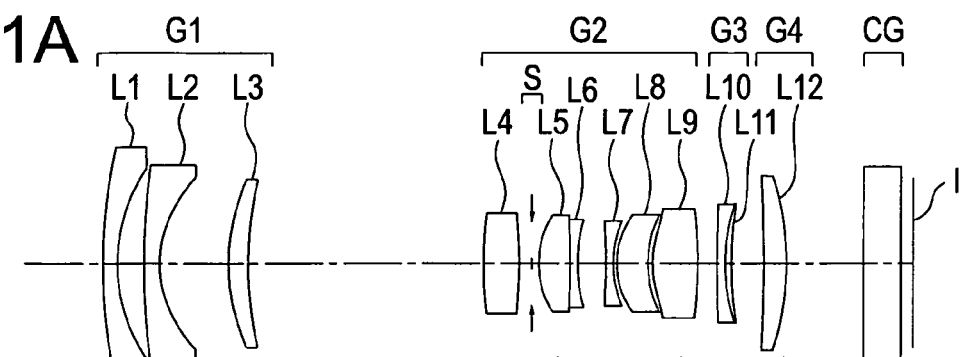
FIG. 1A, FIG. 1B, and FIG. 1C are cross-sectional views along an optical axis showing an optical arrangement at the time of infinite object point focusing of an image forming optical system according to a first embodiment of the present invention, where.

To start with, prior to the description of embodiments, an action and an effect of an image forming optical system of the embodiments will be described below.

To solve the abovementioned issues, it is desirable that the image forming optical system which is to be used in an image pickup apparatus of the present invention, includes in order from an object side a first lens group having a negative refractive power, a second lens group having a positive refractive power, which includes an aperture stop;

a third lens group having a negative refractive power, and a fourth lens group having a positive refractive power, and the first lens group, in order from the object side, includes a negative sub-group, and a positive sub-group, and the third lens group is a focusing group which includes only a cemented lens having a convex surface directed toward the object side, of a negative lens and a positive meniscus lens, in order from the object side.

By making an arrangement such that the first lens group includes the negative sub-group and the positive sub-group in order from the object side, it is possible to suppress a height of light rays to the second lens group, and to carry out effectively, a correction of a longitudinal aberration and an oblique aberration (particularly, an astigmatism and a chromatic aberration), and an improvement of Petzval's sum.

By letting the third lens group to be a focusing group which includes only the cemented lens as mentioned above, the third lens group is made simple. Moreover, by making a shape of the cemented lens to be a negative meniscus having a convex surface directed toward the object side, it is possible to reduce a volume occupied by the lens, to be smaller than a volume in a case of a biconcave negative lens, and to make the lens light-weight effectively. Moreover, by letting the shape of the cemented lens such that the convex surface is directed toward the object side, it is possible to suppress effectively an image-plane fluctuation from infinity to a close point.

Moreover, in the image forming optical system according to the present invention, it is desirable that the image forming optical system satisfies the following conditional expression (1).

$$N_{d3} \leq -0.03 \times v_{d3} + 2.37 \quad (1)$$

where, $N_{d3}$ denotes a refractive index for a d-line of a glass material of the positive meniscus lens in the third lens group of the image forming optical system, $v_{d3}$ denotes Abbe's number (nd1−1)/(nF1−nC1) with reference to the d-line, for the glass material of the positive meniscus lens in the third lens group of the image forming optical system, and nd1, nC1, and nF1 denote refractive indices of the glass material of the positive meniscus lens in the third lens group for the d-line, a C-line, and an F-line respectively.

Conditional expression (1) indicates a range for selecting a positive meniscus glass material in the third lens group of the image forming optical system. By selecting a glass material which satisfies conditional expression (1), it is possible to carry out effectively a correction of a chromatic aberration from infinity to a close-point state, and an improvement of Petzval's sum. When an upper limit value of conditional expression (1) is surpassed, the correction of the chromatic aberration (particularly, the fluctuation due to focusing) and the correction of Petzval's sum cannot be carried out sufficiently.

In this case, the glass material means a lens material such as glass, plastic, and resin. Moreover, lens which has been selected appropriately from such glass materials is to be used for the cemented lens.

Moreover, it is desirable that the cemented lens is a compound lens. It is possible to realize a compound lens by hardening upon adhering closely a resin as a second lens, to a surface of a first lens. By letting the cemented lens to be a compound lens, it is possible to improve a manufacturing accuracy. As a method for manufacturing a compound lens, molding is available. In molding, there is a method in which, a second lens material (such as an energy curable transparent resin) is brought in contact with the first lens, and the second lens material is adhered closely to the first lens material directly. This method is extremely effective for thinning a lens component.

Moreover, in a case of letting the cemented lens to be a compound lens, a glass, as the first lens, may be adhered closely to a surface of the second lens, and hardened. Glass, as compared to a resin, is advantageous from a point of resistance such as a light resistance and a chemical resistance. In this case, as properties of the second lens material, it is necessary that, a melting point and a transition point are lower than a melting point and a transition point of the material of the first lens. As a method for manufacturing the compound lens, molding is available. In molding, there is a method in which, the second lens material is brought in contact with the first lens, and the second lens material is adhered closely to the first lens material directly. This method is extremely effective for thinning a lens component. A surface treatment such as coating may be carried out in advance on the first lens.

As an example of the energy curable resin, an ultraviolet-curing resin is available. In both the cases namely, a case in which the first lens is made of a resin and a case in which the first lens is made of glass, a surface treatment such as coating may be carried out in advance on a side of a lens which becomes a base material. Moreover, when the second lens is thinner the first lens may be adhered closely to the second lens. Moreover, the first lens may be made of an inorganic material such as glass. However, when the second lens which is to be cemented is made of resin, taking into consideration stability of optical performance with respect to a change in the environment, it is preferable that the second lens is similarly of a material having resin as a base material.

The energy curable transparent resin can be treated not only as a compound lens but also as a single lens. A specific gravity of the energy curable transparent resin being low, it is possible to make lighter than glass by using a single lens. Although it is not specified as an embodiment, by forming a focusing group of two lens components namely the energy curable transparent resin and glass or plastic, it is possible to make the size small similarly as the compound lens.

For making the focusing lens group light-weight, it is preferable to use a glass material of the third lens group of the image forming optical system, having a low specific gravity. Examples of a glass material having a low specific gravity are S-BSL 7, S-FSL 5, S-NSL 3, and S-NSL 36 manufactured by Ohara Inc., and ZEONEX 480 and ZEONEXE 48R manufactured by Zeon Corporation. Incidentally, the abovementioned glass materials generally have a refractive index of about 1.5 and Abbe's number of about 55.

Moreover, in the image forming optical system according to the present invention, it is desirable that the image forming optical system satisfies the following conditional expression (2).

$$3.3 \leq f_{1T}/F_W \leq 5.8 \quad (2)$$

where, $f_{1T}$ denotes a focal length of the positive sub-group in the first lens group of the image forming optical system, and $F_W$ denotes a focal length of the overall optical system at a wide angle end, of the image forming optical system.

The abovementioned conditional expression (2) is an expression indicating a range of a ratio of the focal length of the positive sub-group in the first group with respect to the focal length of the overall optical system at the wide angle end, of the image forming optical system.

When an upper limit value 5.8 of conditional expression (2) is surpassed, a refractive power of the positive sub-group in the first lens group becomes excessively small. Therefore, a height of light rays to the first lens group increases, and correction of the longitudinal aberration and oblique aberration (particularly, the coma aberration, the astigmatism, and the chromatic aberration) and improvement of the Petzval's sum cannot be carried out.

When a lower limit value 3.3 of conditional expression (2) is surpassed, the refractive power of the positive sub-group in the first lens group becomes excessively large. Therefore, a diameter of lenses from the second lens group onward becomes large, leading to an increase in volume of the focusing lens group, or in other words, an increase in weight of the focusing lens group. Therefore, correction of the oblique aberration (particularly the chromatic aberration, the coma aberration, and the astigmatism) at the wide angle end, and shortening of an overall length of the optical system cannot be carried out effectively, thereby making it difficult to achieve a compact image forming optical system.

It is more preferable that the image forming optical system according to the present invention satisfies the following conditional expression (2') instead of conditional expression (2).

$$3.8 \leq f_{1T}/F_W \leq 5.3 \quad (2')$$

Furthermore, it is all the more preferable that the image forming optical system according to the present invention satisfied the following conditional expression (2") instead of conditional expression (2).

$$4.0 \leq f_{1T}/F_W \leq 5.0 \quad (2'')$$

Moreover, in the image forming optical system according to the present invention, it is desirable that the image forming optical system satisfies the following conditional expression (3).

$$0.375 \leq d_{1T}/d_{G1} \leq 0.52 \quad (3)$$

where, $d_{1T}$ denotes a distance on an optical axis between the negative sub-group and the positive sub-group in the first lens group of the image forming optical system, and $d_{G1}$ denotes a distance on the optical axis from a starting surface up to a last surface of the first lens unit of the image forming optical system.

The abovementioned conditional expression (3) is an expression indicating a ratio of the distance between the negative sub-group and the positive sub-group in the first lens group of the image forming optical system with respect to the distance from the starting surface up to the last surface of the first lens group of the image forming optical system.

When an upper limit value 0.52 of conditional expression (3) is surpassed, the first lens group becomes thick, and when an attempt is made to maintain a compactness in this state, correction of astigmatism of high order from the wide angle end to an intermediate state, and correction of the chromatic aberration in all states from infinity to a close point cannot be carried out effectively.

When a lower limit value 0.375 of conditional expression (3) is surpassed, correction of the chromatic aberration in all states from infinity to a close point, and correction of the oblique aberration (particularly the coma aberration) at the wide angle end cannot be carried out effectively.

It is more preferable that the image forming optical system according to the present invention satisfies the following conditional expression (3') instead of conditional expression (3).

$$0.375 \leq d_{1T}/d_{G1} \leq 0.505 \quad (3')$$

Furthermore, it is all the more preferable that the image forming optical system of the present inventions satisfies the following conditional expression (3") instead of conditional expression (3).

$$0.4 \leq d_{1T}/d_{G1} \leq 0.49 \quad (3'')$$

Moreover, in the image forming optical system according to the present invention, it is desirable that the image forming optical system satisfies the following conditional expression (4).

$$0.91 \leq (MG_W \times MG_t)^{1/2} \leq 1.15 \quad (4)$$

where, $MG_W$ denotes a combined magnification of the image forming optical system from the second lens group onward, at the wide angle end, and $MG_t$ denotes a combined magnification of the image forming optical system from the second lens group onward, at a telephoto end.

The abovementioned conditional expression (4) is an expression in which, a square root of a product of the combined magnification of the image forming optical system from the second lens group onward, at the wide angle end, and the combined magnification of the image forming optical system from the second lens group onward, at the telephoto end is taken, and closer the square root of the product to one, it is possible to shorten the overall length of the optical system, and it is possible to achieve a compact image forming optical system.

When an upper limit value 1.15 of conditional expression (4) is surpassed, a focusing fluctuation of the spherical aberration and the coma aberration in particular, from infinity to a close point becomes large, and aberration correction cannot be carried out effectively.

When a lower limit value 0.91 of conditional expression (4) is surpassed, a diameter of lenses in the third lens group in particular, of the image forming optical system increases for securing marginal quantity of light. The third lens group being the focusing group, an increase in the lens diameter means an increase in weight, thereby making it inappropriate for making the focusing lens group light-weight.

It is more desirable that the image forming optical system according to the present invention satisfies the following conditional expression (4') instead of conditional expression (4).

$$0.92 \leq (MG_W \times MG_t)^{1/2} \leq 1.05 \quad (4')$$

Moreover, in the image forming optical system according to the present invention, it is desirable that the image forming optical system satisfies the following conditional expression (5).

$$-2.5 \leq (R_{G3b}+R_{G3a})/(R_{G3b}-R_{G3a}) < -1 \quad (5)$$

where, $R_{G3a}$ denotes a radius of curvature of a surface on the object side, of the cemented lens in the third lens group of the image forming optical system, and $R_{G3b}$ denotes a radius of curvature of a surface on an image side, of the cemented lens in the third lens group of the image forming optical system.

Conditional expression (5) is a mathematical expression of a shape of the cemented lens in the third lens group of the image forming optical system. By satisfying conditional expression (5), it is possible to correct favorably a fluctuation of astigmatism at infinity and a close point state.

When an upper limit value −1 of conditional expression (5) is surpassed, the shape of the cemented lens becomes a shape of a biconcave lens, which leads to an increase in volume of the overall cemented lens, or in other words an increase in weight of the overall cemented lens, thereby making it inappropriate for making the focusing group light-weight.

When a lower limit value −2.5 of conditional expression (5) is surpassed, fluctuation of astigmatism at the wide angle end, from infinity to a close-point state becomes large, and aberration correction cannot be carried out effectively.

It is more desirable that the image forming optical system according to the present invention satisfies the following conditional expression (5') instead of conditional expression (5).

$$-2.0 \leq (R_{G3b}+R_{G3a})/(R_{G3b}-R_{G3a}) < -1 \quad (5')$$

It is all the more preferable that the image forming optical system according to the present invention satisfies the following conditional expression (5") instead of conditional expression (5).

$$-1.5 \leq (R_{G3b}+R_{G3a})/(R_{G3b}-R_{G3a}) < -1 \quad (5'')$$

Moreover, in the image forming optical system according to the present invention, it is desirable that the image forming optical system satisfies the following conditional expression (6).

$$-1.95 \leq (R_{G3ob}+R_{G3oa})/(R_{G3ob}-R_{G3oa}) < -1 \quad (6)$$

where, $R_{G3oa}$ denotes a radius of curvature of a surface on the object side, of the negative lens in the third lens group of the image forming optical system, and $R_{G3ob}$ denotes a radius of curvature of a surface on an image side, of the negative lens in the third lens group of the image forming optical system.

The abovementioned conditional expression (6) is a mathematical expression of a shape of the negative lens in the third lens group of the image forming optical system. By satisfying conditional expression (6), it is possible to correct favorably a fluctuation of astigmatism at infinity and a close point.

When an upper limit value −1 of conditional expression (6) is surpassed, the shape of the negative lens becomes a shape of a biconcave lens, which leads to an increase in volume of the overall negative lens, or in other words an increase in weight of the overall negative lens, thereby making it inappropriate for making the focusing group light-weight.

When a lower limit value −1.95 of conditional expression (6) is surpassed, fluctuation of astigmatism at the wide angle end, from infinity to a close-point state becomes large, and aberration correction cannot be carried out effectively.

It is more desirable that the image forming optical system according to the present invention satisfies the following conditional expression (6') instead of conditional expression (6).

$$-1.55 \leq (R_{G3ob}+R_{G3oa})/(R_{G3ob}-R_{G3oa}) < -1 \quad (6')$$

It is all the more preferable that the image forming optical system according to the present invention satisfies the following conditional expression (6'') instead of conditional expression (6).

$$-1.4 \leq (R_{G3ob}+R_{G3oa})/(R_{G3ob}-R_{G3oa}) < -1 \quad (6'')$$

Moreover, in the image forming optical system according to the present invention, it is desirable that in the fourth lens group, there is at least one lens component which satisfies the following conditional expression (7).

$$-4.5 \leq (R_{G4b}+R_{G4a})/(R_{G4b}-R_{G4a}) \leq -1.2 \quad (7)$$

where, $R_{G4a}$ denotes a radius of curvature of a surface on the object side of a lens in the fourth lens group of the image forming optical system, and $R_{G4b}$ denotes a radius of curvature of a surface on an image side of a lens in the fourth lens group of the image forming optical system.

The abovementioned conditional expression (7) is a mathematical expression of a shape of a lens in the fourth lens group of the image forming optical system.

When an upper limit value −1.2 of conditional expression (7) is surpassed, the diameter of lenses in the third lens group of the image forming optical system increases for securing oblique incident light. The third lens group being the focusing group, the increase in the lens diameter means the increase in the weight, thereby making it inappropriate for making the focusing lens group light-weight.

When a lower limit value −4.5 of conditional expression (7) is surpassed, the spherical aberration and the coma aberration at the wide angle end cannot be corrected effectively.

It is more desirable that the image forming optical system according to the present invention satisfies the following conditional expression (7') instead of conditional expression (7).

$$-3.5 \leq (R_{G4b}+R_{G4a})/(R_{G4b}-R_{G4a}) \leq -1.2 \quad (7')$$

Furthermore, it is all the more preferable that the image forming optical system according to the present invention satisfies the following conditional expression (7'') instead of conditional expression (7).

$$-2.9 \leq (R_{G4b}+R_{G4a})/(R_{G4b}-R_{G4a}) \leq -1.2 \quad (7'')$$

Moreover, in the image forming optical system according to the present invention, it is desirable that in the second lens group of the image forming optical system, there are at least two air lenses having a meniscus shape.

Moreover, it is desirable that in the second lens group of the image forming optical system according to the present invention, there is only one lens component between the air lenses having the meniscus shape.

Moreover, it is desirable that in the second lens group of the image forming optical system according to the present invention, the air lens having the meniscus shape has a convex surface directed toward the object side, and satisfies the following conditional expression (8).

$$1.3 \leq |(R_{G2mb}+R_{G2ma})/(R_{G2mb}-R_{G2ma})| \quad (8)$$

where, $R_{G2ma}$ denotes a radius of curvature of a surface on the object side of the air lens having the meniscus shape in the second lens group of the image forming optical system, and $R_{G2mb}$ denotes a radius of curvature of a surface on an image side of the air lens having the meniscus shape in the second lens group of the image forming optical system.

Conditional expression (8) is a mathematical expression of a shape of the air lens having the meniscus shape in the second lens group of the image forming optical system.

By making the abovementioned arrangement, it is possible to carry out correction of deterioration of image-plane fluctuation and the coma aberration at the time of focusing from infinity to a close-point state.

Moreover, in the image forming optical system according to the present invention, it is desirable that the aperture stop is farther on the object side of the last surface of the second lens group of the image forming optical system.

By making the abovementioned arrangement, it is possible to bring a position of a principal point of the second lens group of the image forming optical system on the object side, and to suppress the diameter of the first lens group from increasing, and to make small an angle of output of a principal light ray from the last surface of the second lens group of the image forming optical system. By these effects, it is possible to carry out correction of longitudinal aberration and oblique aberration (particularly, the coma aberration and the astigmatism) effectively, and to prevent the diameter of the second lens group from becoming large.

In the image forming optical system according to the present invention, it is desirable that a position of the fourth lens group is fixed at the time of zooming change.

In the image forming optical system according to the present invention, it is desirable that a position of the first lens group is fixed at the time of zooming change.

By making the abovementioned arrangement of the first lens group and the fourth lens group of the image forming optical system, it is possible to reduce the number of lens groups which move at the time of zooming, and to make a structure of a lens barrel simple. Accordingly, it is possible to make the overall interchangeable lens more compact.

Moreover, it is preferable to let an electronic image pickup apparatus of the embodiments to be an electronic image pickup apparatus which includes the abovementioned image forming optical system. In the abovementioned image forming optical system, it is possible to reduce an overall length and a thickness when the lens of the optical system is collapsed, without deteriorating an aberration such as the chromatic aberration. Therefore, when such image forming optical system is used in an electronic image pickup apparatus, it is possible to have a slim electronic image pickup apparatus while achieving an image of a high quality.

As it has been described above, according to the present invention, it is possible to provide an image pickup apparatus which includes a compact image forming optical system which can be made light-weight for making silent at the time of driving the focusing lens group, and to maintain optical performance favorably from infinity to a close point.

EMBODIMENTS

Exemplary embodiments of the image forming optical system and the electronic image pickup apparatus according to the present invention will be described below in detail by referring to the accompanying diagrams. However, the present invention is not restricted to the embodiments described below.

Figure 1B:
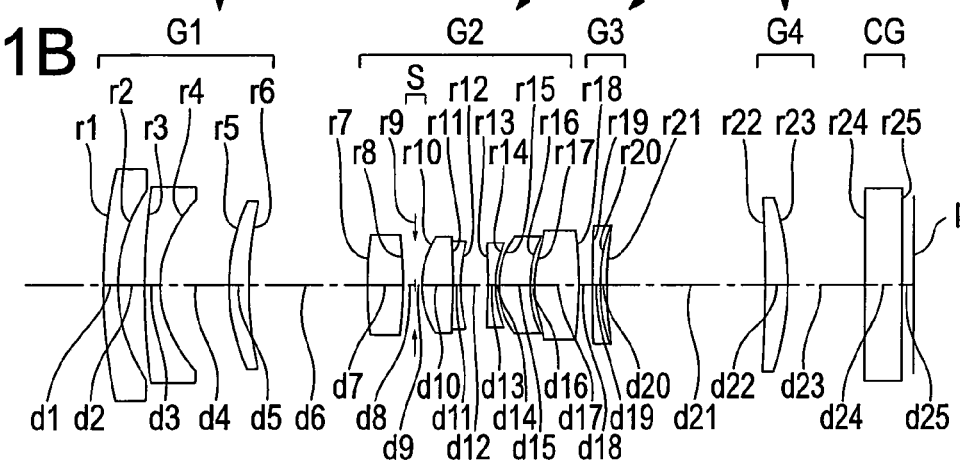
Figure 1C:
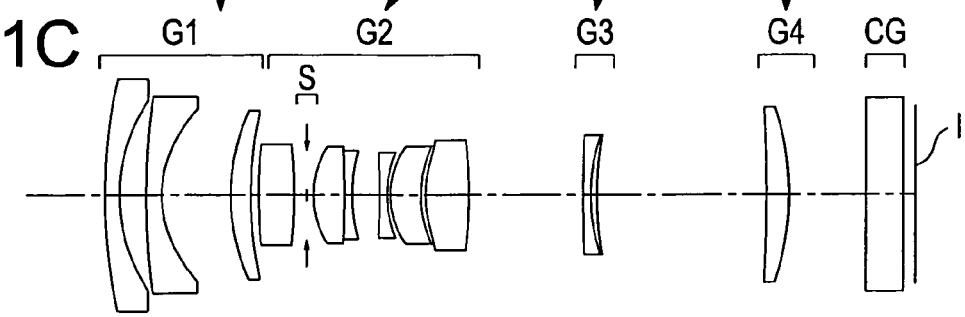

To start with, an image forming optical system according to a first embodiment of the present invention will be described below. FIG. 1A, FIG. 1B, and FIG. 1C are cross-sectional views along an optical axis showing an optical arrangement at the time of infinite object point focusing of the image forming optical system according to the first embodiment of the present invention, where, FIG. 1A shows a state at a wide angle end, FIG. 1B shows an intermediate focal length state, and FIG. 1C shows a state at a telephoto end.

FIG. 2A, FIG. 2B, and FIG. 2C are diagrams showing a spherical aberration (SA), an astigmatism (AS), a distortion (DT), and a chromatic aberration of magnification (CC) at the time of infinite object point focusing of the image forming optical system according to the first embodiment, where, FIG. 2A shows a state at the wide angle end, FIG. 2B shows an intermediate focal length state, and FIG. 2C shows a state at the telephoto end. Moreover, FIY denotes an image height. Symbols in aberration diagrams are same for the embodiments which will be described later.

Figure 3A:
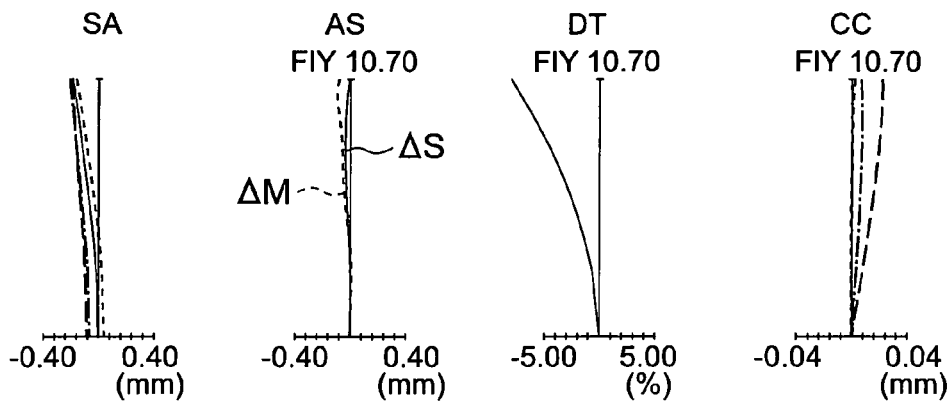
FIG. 3A, FIG. 3B, and FIG. 3C are diagrams showing the spherical aberration, the astigmatism, the distortion, and the chromatic aberration of magnification at the time of focusing at an object point which is 250 mm from the image plane according to the first embodiment, where.
Figure 3B:
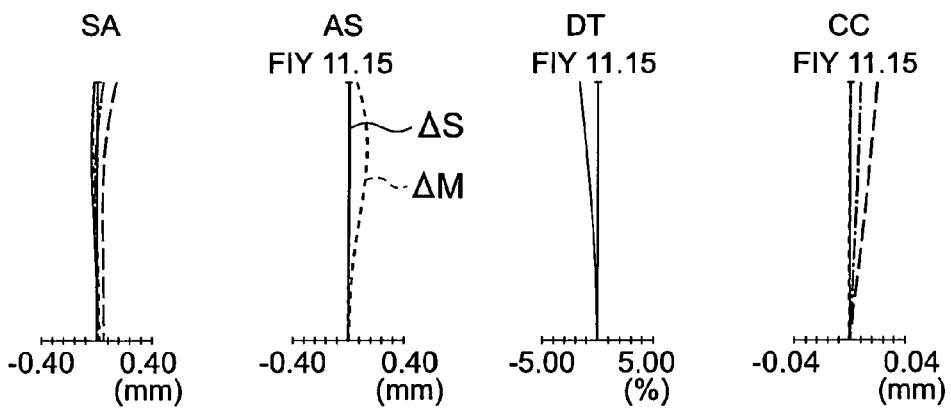
Figure 3C:
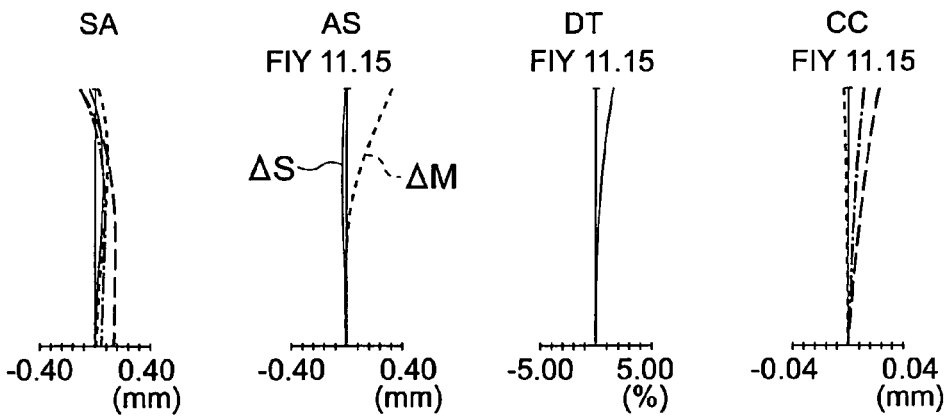

FIG. 3A, FIG. 3B, and FIG. 3C are diagrams showing the spherical aberration, the astigmatism, the distortion, and the chromatic aberration of magnification at the time of focusing at an object point which is 250 mm from the image plane according to the first embodiment, where, FIG. 3A shows a state at the wide angle end, FIG. 3B shows an intermediate state, and FIG. 3C shows a state at the telephoto end.

The image forming optical system according to the first embodiment, as shown in FIG. 1A, FIG. 1B, and FIG. 1C, includes in order from an object side, a first lens group G1 having a negative refractive power, a second lens group G2 having a positive refractive power, which includes an aperture stop S, a third lens group G3 having a negative refractive power, and a fourth lens group G4 having a positive refractive power. In all the embodiments which will be described below, in the lens cross-sectional views, CG denotes a cover glass, and I denotes an image pickup surface of an electronic image pickup element.

The first lens group G1, in order from the object side, includes a negative meniscus lens L1 having a convex surface directed toward the object side, a negative meniscus lens L2 having a convex surface directed toward the object side, and a positive meniscus lens L3 having a convex surface directed toward the object side, and has a negative refractive power as a whole. Here, the negative meniscus lens L1 and the negative meniscus lens L2 are a negative sub-group, and the positive meniscus lens L3 is a positive sub-group.

The second lens group G2, in order from the object side, includes a biconvex positive lens L4, the aperture stop S, a cemented lens of a biconvex positive lens L5 and a biconcave negative lens L6, a biconcave negative lens L7, a positive meniscus lens L8 having a convex surface directed toward the object side, and a biconvex positive lens L9, and has a positive refractive power as a whole. In the second lens group, an air lens having a meniscus shape is disposed between the biconcave negative lens L7 and the positive meniscus lens L8, and between the positive meniscus lens L8 and the biconvex positive lens L9.

The third lens group G3 includes a cemented lens of a negative meniscus lens L10 having a convex surface directed toward the object side and a positive meniscus lens L11 having a convex surface directed toward the object side, in order from the object side, and has a negative refractive power as a whole.

The fourth lens group G4 includes a positive meniscus lens L12 having a convex surface directed toward an image side, and has a positive refractive power as a whole.

At the time of zooming from the wide angle end to the telephoto end, the first lens group G1 is fixed and does not move. The second lens group G2 moves toward the object side while narrowing a distance from the first lens group G1. The third lens group G3 moves toward the object side while narrowing a distance from the second lens group G2, from the wide angle end up to the intermediate state, and moves slightly toward the object side while widening the distance from the second lens group G2, from the intermediate state up to the telephoto end. Moreover, the third lens group G3, at the time of focusing from infinity to a close point, moves toward the image side while widening a distance from the second lens group G2. The fourth lens group G4 is fixed, and does not move.

An aspheric surface is provided to five surfaces namely, a surface on the image side of the negative meniscus lens L2 on the object side in the first lens group G1, a surface on the object side of the biconvex positive lens L5 of the cemented lens and both surfaces of the biconvex positive lens L9 nearest to the image side in the second lens group G2, and a surface on the image side of the positive meniscus lens L11 in the third lens group G3.

Next, an image forming optical system according to a second embodiment of the present invention will be described below. FIG. 4A, FIG. 4B, and FIG. 4C are cross-sectional views along an optical axis showing an optical arrangement at the time of infinite object point focusing of an image forming optical system according to the second embodiment of the present invention, where, FIG. 4A shows a state at a wide angle end, FIG. 4B shows an intermediate focal length state, and FIG. 4C shows a state at a telephoto end.

Figure 5A:
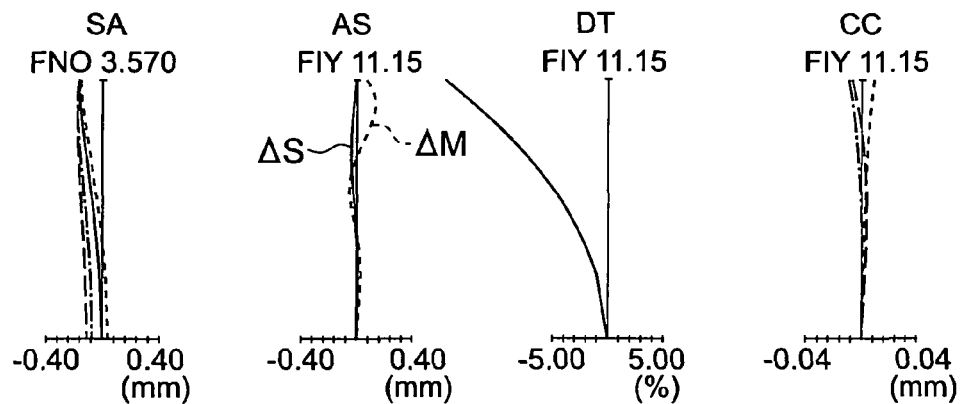
FIG. 5A, FIG. 5B, and FIG. 5C are diagrams showing a spherical aberration, an astigmatism, a distortion, and a chromatic aberration of magnification at the time of infinite object point focusing of the image forming optical system according to the second embodiment, where.
Figure 5B:
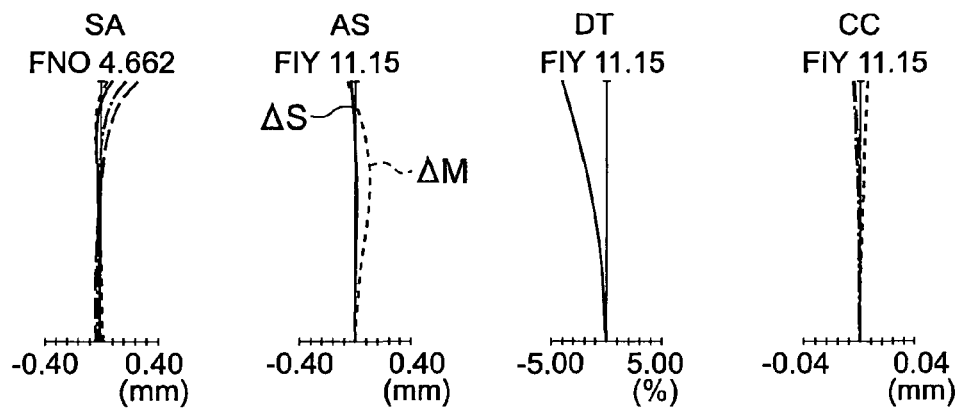
Figure 5C:
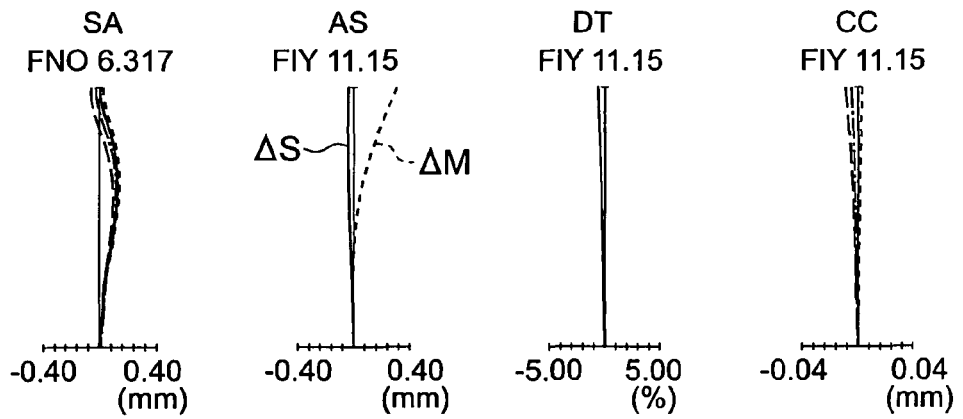

FIG. 5A, FIG. 5B, and FIG. 5C are diagrams showing a spherical aberration, an astigmatism, a distortion, and a chromatic aberration of magnification at the time of infinite object point focusing of the image forming optical system according to the second embodiment, where, FIG. 5A shows a state at the wide angle end, FIG. 5B shows an intermediate focal length state, and FIG. 5C shows a state at the telephoto end.

Figure 6A:
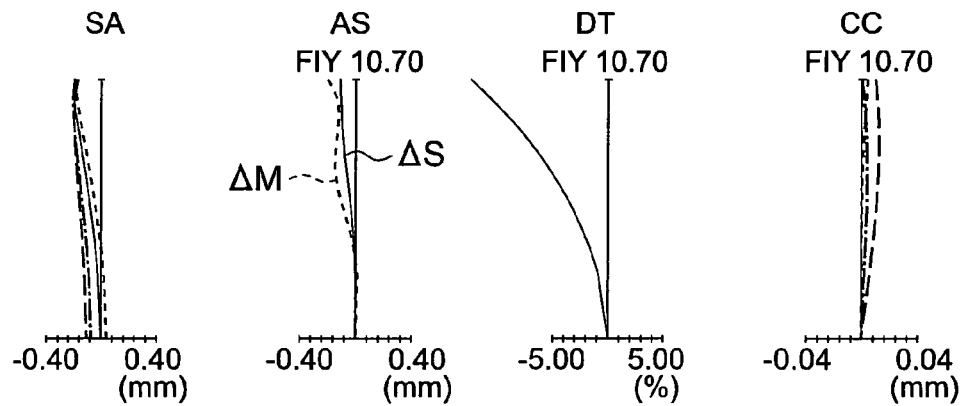
FIG. 6A, FIG. 6B, and FIG. 6C are diagrams showing the spherical aberration, the astigmatism, the distortion, and the chromatic aberration of magnification at the time of focusing at an object point which is 250 mm from the image plane according to the second embodiment, where.
Figure 6B:
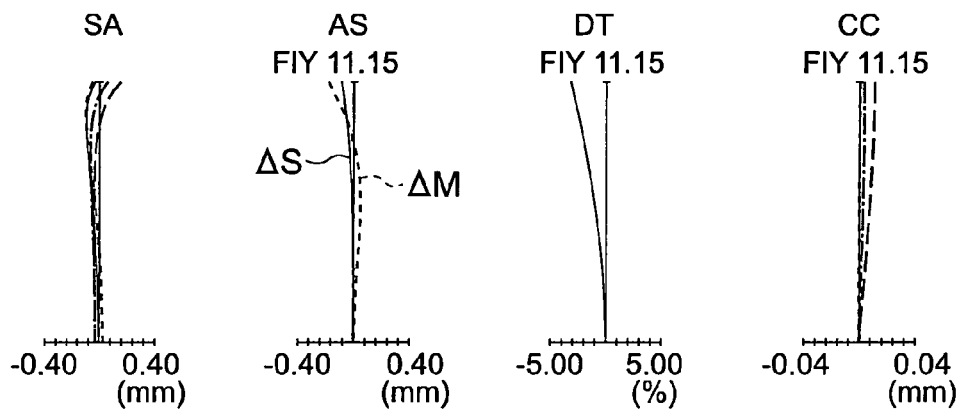
Figure 6C:
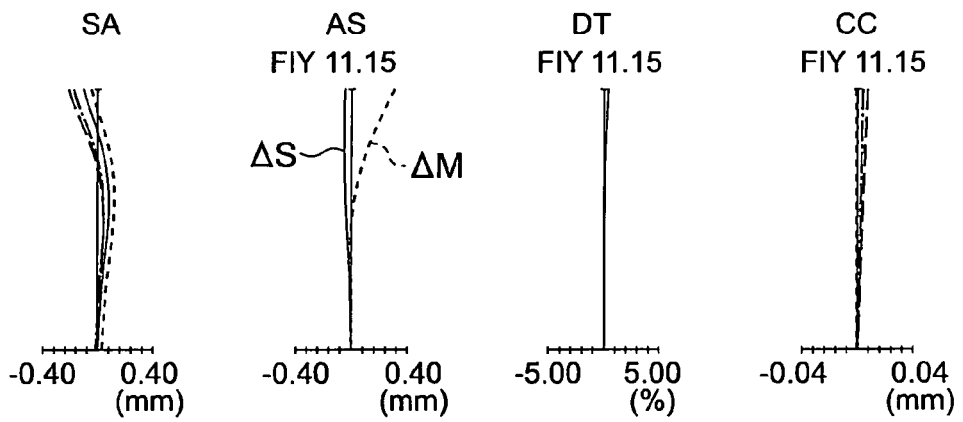

FIG. 6A, FIG. 6B, and FIG. 6C are diagrams showing the spherical aberration, the astigmatism, the distortion, and the chromatic aberration of magnification at the time of focusing at an object point which is 250 mm from the image plane according to the second embodiment, where, FIG. 6A shows a state at the wide angle end, FIG. 6B shows an intermediate state, and FIG. 6C shows a state at the telephoto end.

The image forming optical system according to the second embodiment, as shown in FIG. 4A, FIG. 4B, and FIG. 4C, includes in order from an object side, a first lens group G1 having a negative refractive power, a second lens group G2 having a positive refractive power, which includes an aperture stop S, a third lens group G3 having a negative refractive power, and a fourth lens group G4 having a positive refractive power.

The first lens group G1 includes in order from the object side, a negative meniscus lens L1 having a convex surface directed toward the object side, a negative meniscus lens L2 having a convex surface directed toward the object side, and a positive meniscus lens L3 having a convex surface directed toward the object side, and has a negative refractive power as a whole. Here, the negative meniscus lens L1 and the negative meniscus lens L2 are a negative sub-group, and the positive meniscus lens L3 is a positive sub-group.

The second lens group G2 includes in order form the object side, a biconvex positive lens L4, the aperture stop S, a cemented lens of a biconvex positive lens L5 and a biconcave negative lens L6, a negative meniscus lens L7 having a convex surface directed toward the object side, a positive meniscus lens L8 having a convex surface directed toward the object side, and a biconvex positive lens L9, and has a positive refractive power as a whole. In the second lens group G2, an air lens having a meniscus shape is disposed between the negative meniscus lens L7 and the positive meniscus lens L8, and between the positive meniscus lens L8 and the biconvex positive lens L9.

The third lens group G3 includes in order from the object side, a cemented lens of a negative meniscus lens L10 having a convex surface directed toward the object side and a positive meniscus lens L11 having a convex surface directed toward the object side, and has a negative refractive power as a whole.

The fourth lens group G4 includes a positive meniscus lens L12 having a convex surface directed toward an image side, and has a positive refractive power.

At the time of zooming from the wide angle end to the telephoto end, the first lens group G1 is fixed and does not move. The second lens group G2 moves toward the object side while narrowing a distance between the first lens group G1. The third lens group G3 moves toward the object side while narrowing a distance from the second lens group G2, from the wide angle end up to the intermediate state, and moves slightly toward the object side while widening the distance from the second lens group G2, from the intermediate state up to the telephoto end. The third lens group G3, at the time of focusing from infinity to a close point, moves toward the image side while narrowing a distance from the second lens group G2. The fourth lens group G4 is fixed and does not move.

An aspheric surface is provided to five surfaces namely, a surface on the image side of the negative meniscus lens L2 on the image side in the first lens group G1, a surface on the object side of the biconvex positive lens L5 of the cemented lens, and both surfaces of the biconvex positive lens L9 nearest to the image side in the second lens group G2, and a surface on the image side of the positive meniscus lens L11 in the third lens group G3.

Next, an image forming optical system according to a third embodiment of the present invention will be described below. FIG. 7A, FIG. 7B, and FIG. 7C are cross-sectional views along an optical axis showing an optical arrangement at the time of infinite object point focusing of the image forming optical system according to the third embodiment of the present invention, where, FIG. 7A shows a state at a wide angle end, FIG. 7B shows an intermediate focal length state, and FIG. 7C shows a state at a telephoto end.

Figure 8A:
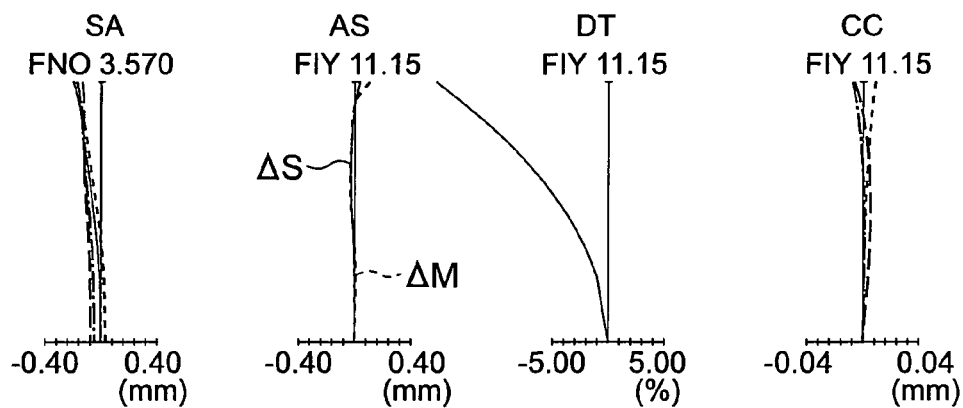
FIG. 8A, FIG. 8B, and FIG. 8C are diagrams showing a spherical aberration, an astigmatism, a distortion, and a chromatic aberration of magnification at the time of infinite object point focusing of the image forming optical system according to the third embodiment, where.
Figure 8B:
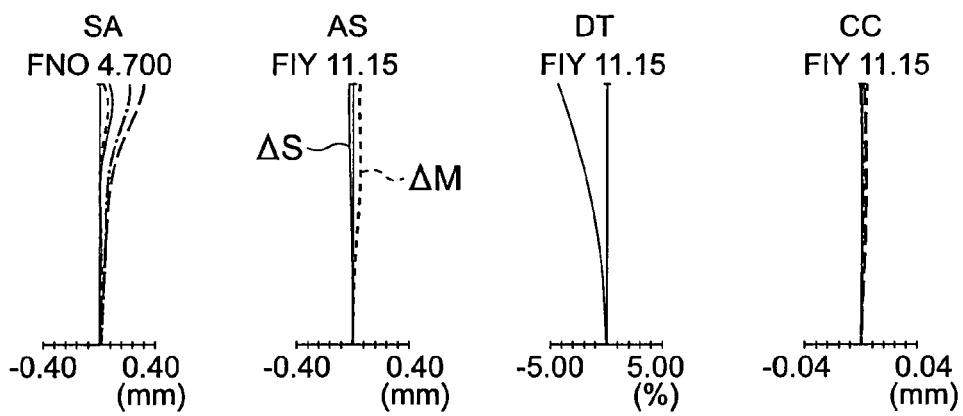
Figure 8C:
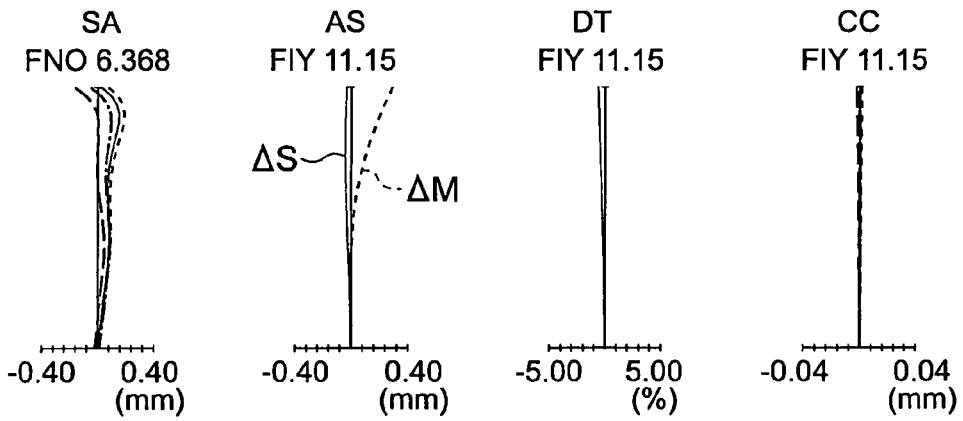

FIG. 8A, FIG. 8B, and FIG. 8C are diagrams showing a spherical aberration, an astigmatism, a distortion, and a chromatic aberration of magnification at the time of infinite object point focusing of the image forming optical system according to the third embodiment, where, FIG. 8A shows a state at the wide angle end, FIG. 8B shows an intermediate focal length state, and FIG. 8C shows a state at the telephoto end.

Figure 9A:
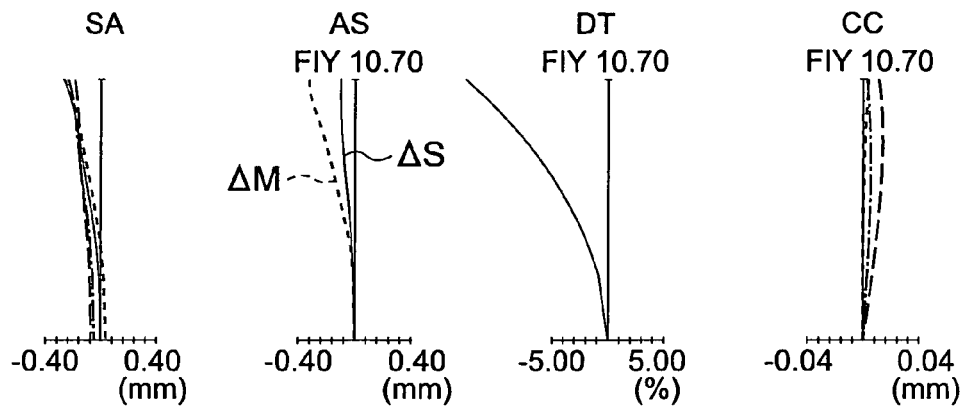
FIG. 9A, FIG. 9B, and FIG. 9C are diagrams showing the spherical aberration, the astigmatism, the distortion, and the chromatic aberration of magnification at the time of focusing at an object point which is 250 mm from the image plane according to the third embodiment, where.
Figure 9B:
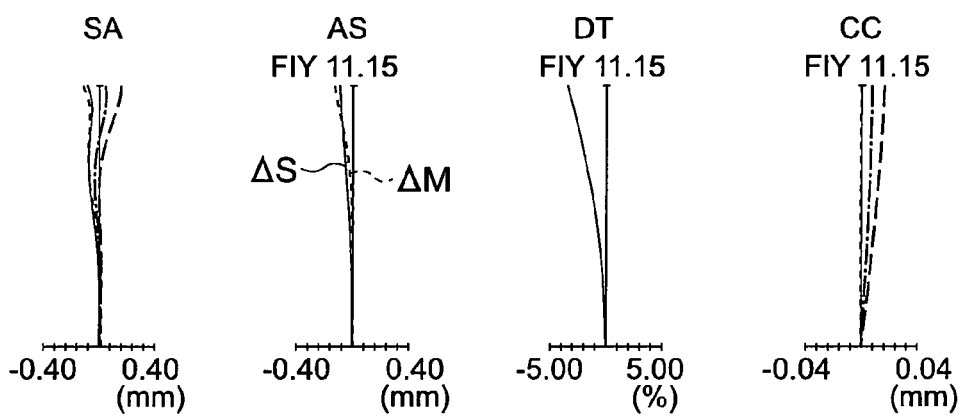
Figure 9C:
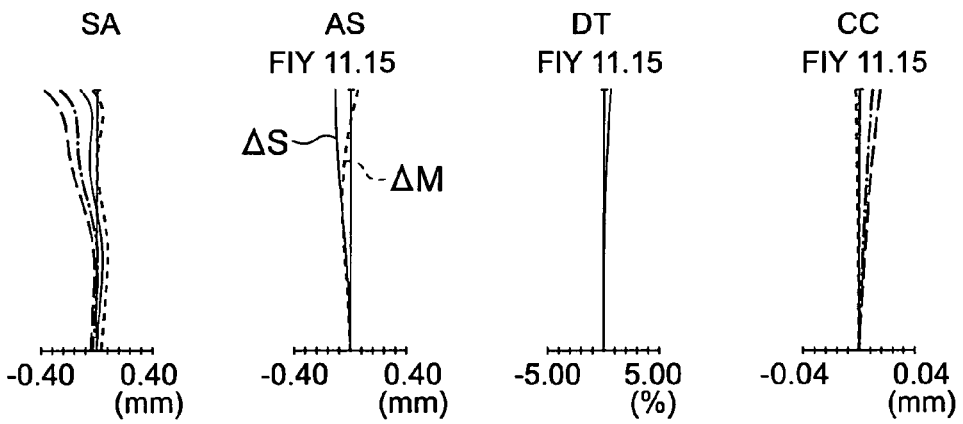

FIG. 9A, FIG. 9B, and FIG. 9C are diagrams showing the spherical aberration, the astigmatism, the distortion, and the chromatic aberration of magnification at the time of focusing at an object point which is 250 mm from the image plane according to the third embodiment, where, FIG. 9A shows a state at the wide angle end, FIG. 9B shows an intermediate state, and FIG. 9C shows a state at the telephoto end.

The image forming optical system according to the third embodiment, as shown in FIG. 7A, FIG. 7B, and FIG. 7C, includes in order from an object side, a first lens group G1 having a negative refractive power, a second lens group G2 having a positive refractive power, which has an aperture stop S, a third lens group G3 having a negative refractive power, and a fourth lens group G4 having a positive refractive power.

The first lens group G1 includes in order from the object side, a negative meniscus lens L1 having a convex surface directed toward the object side, a negative meniscus lens L2 having a convex surface directed toward the object side, and a positive meniscus lens L3 having a convex surface directed toward the object side, and has a negative refractive power as a whole. Here, the negative meniscus lens L1 and the negative meniscus lens L2 are a negative sub-group, and the positive meniscus lens L3 is a positive sub-group.

The second lens group G2 includes in order from the object side, a biconvex positive lens L4, the aperture stop S, a cemented lens of a biconvex positive lens L5 and a biconcave negative lens L6, a negative meniscus lens L7 having a convex surface directed toward the object side, a positive meniscus lens L8 having a convex surface directed toward the object side, and a biconvex positive lens L9, and has a positive refractive power as a whole. In the second lens group G2, an air lens having a meniscus shape is disposed between the biconcave negative lens L6 and the negative meniscus lens L7, between the negative meniscus lens L7 and the positive meniscus lens L8, and between the positive meniscus lens L8 and the biconvex positive lens L9.

The third lens group G3 includes a cemented lens of a negative meniscus lens L10 having a convex surface directed toward the object side and a positive meniscus lens L11 having a convex surface directed toward the object side, in order from the object side, and has a negative refractive power as a whole. The fourth lens group G4 includes a positive meniscus lens L12 having a convex surface directed toward an image side, and has a positive refractive power as a whole.

At the time of zooming from the wide angle end to the telephoto end, the first lens group G1 is fixed and does not move. The second lens group G2 moves toward the object side while narrowing a distance from the first lens group G1. The third lens group G3 moves toward the object side while narrowing a distance from the second lens group G2, from the wide angle end up to the intermediate state, and moves slightly toward the object side while widening the distance from the second lens group G2, from the intermediate state up to the telephoto end. Moreover, the third lens group G3, at the time of focusing from infinity to a close point, moves toward the image side while narrowing a distance from the second lens group G2. The fourth lens group G4 is fixed and does not move.

An aspheric surface is provided to five surfaces namely, a surface on the image side of the negative meniscus lens L2 on the image side in the first lens group G1, a surface on the object side of the biconvex positive lens L5 of the cemented lens and both surface of the biconvex positive lens L9 nearest to the image side in the second lens group G2, and a surface on the image side of the positive meniscus lens L11 in the third lens group G3.

Figure 10A:
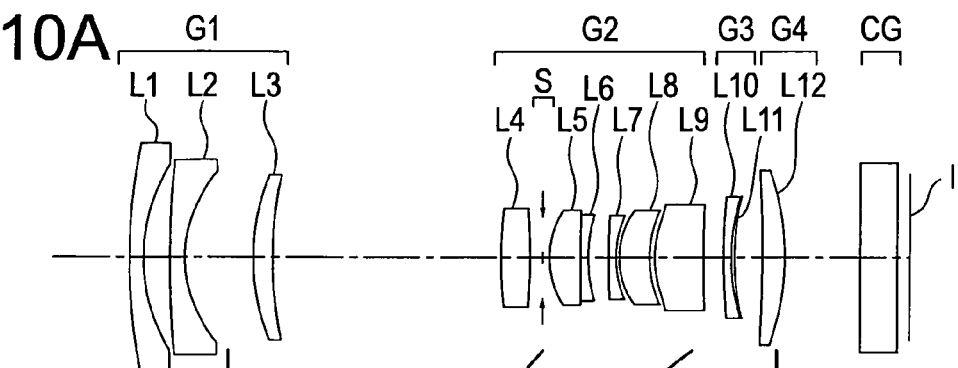
FIG. 10A, FIG. 10B, and FIG. 10C are cross-sectional views along an optical axis showing an optical arrangement at the time of infinite object point focusing of an image forming optical system according to a fourth embodiment of the present invention, where.
Figure 10B:
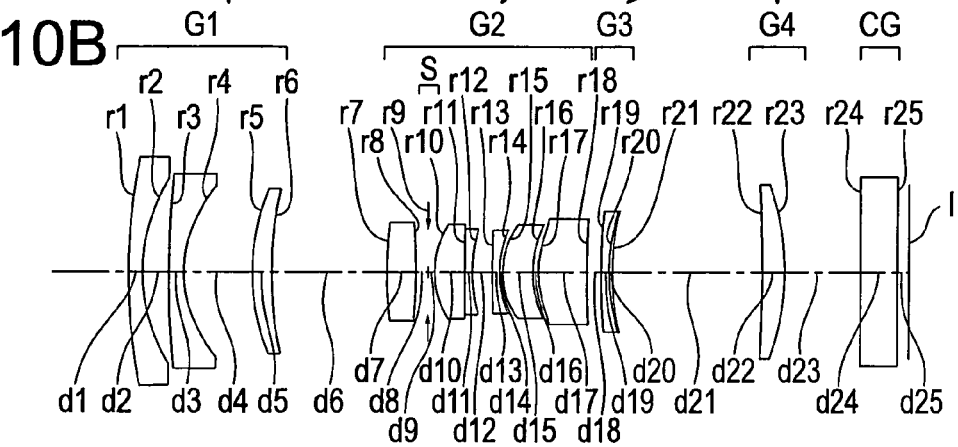
Figure 10C:
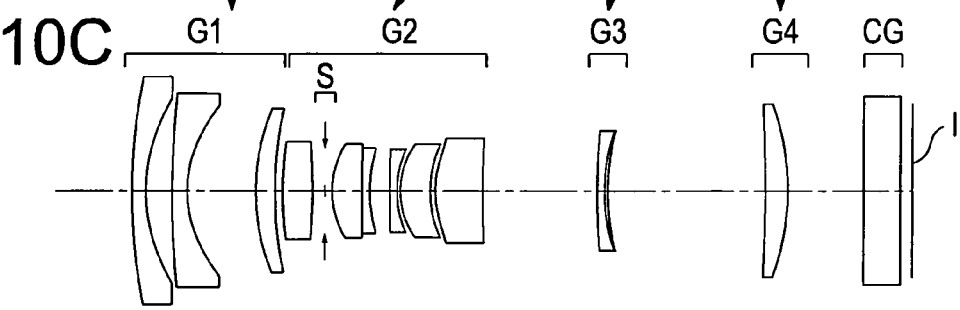

Next, an image forming optical system according to a fourth embodiment of the present invention will be described below. FIG. 10A, FIG. 10B, and FIG. 10C are cross-sectional views along an optical axis showing an optical arrangement at the time of infinite object point focusing of an image forming optical system according to the fourth embodiment of the present invention, where, FIG. 10A shows a state at a wide angle end, FIG. 10B shows an intermediate focal length state, and FIG. 10C shows a state at a telephoto end.

Figure 11A:
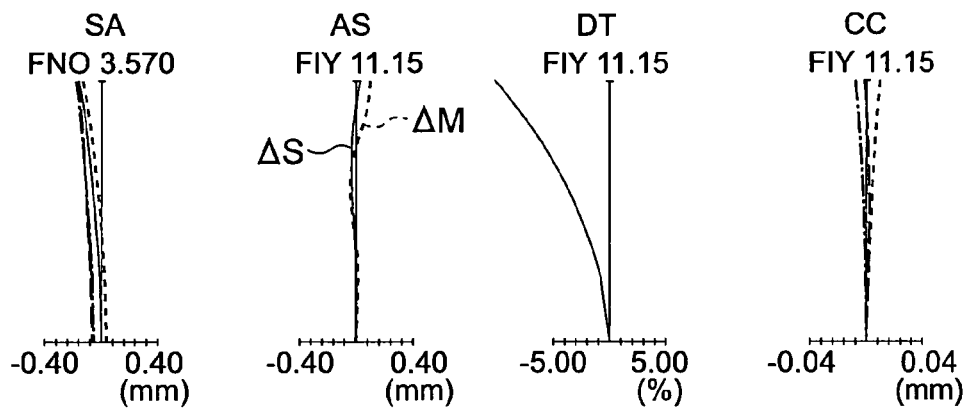
FIG. 11A, FIG. 11B, and FIG. 11C are diagrams showing a spherical aberration, an astigmatism, a distortion, and a chromatic aberration of magnification at the time of infinite object point focusing of the image forming optical system according to the fourth embodiment, where.
Figure 11B:
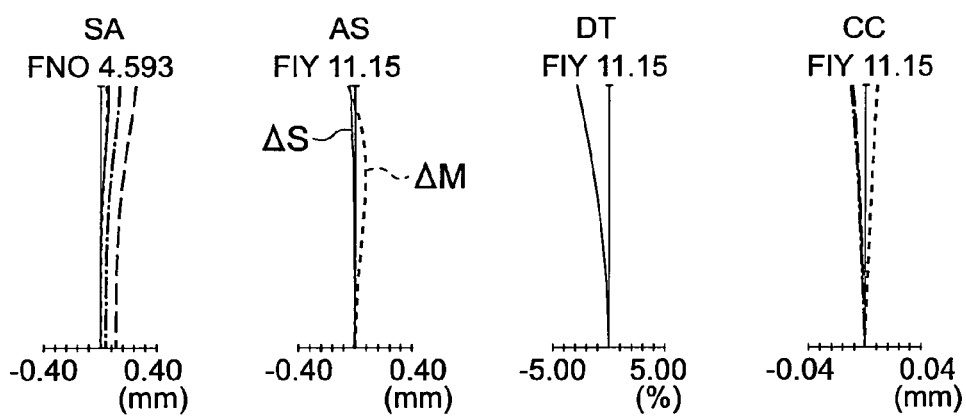
Figure 11C:
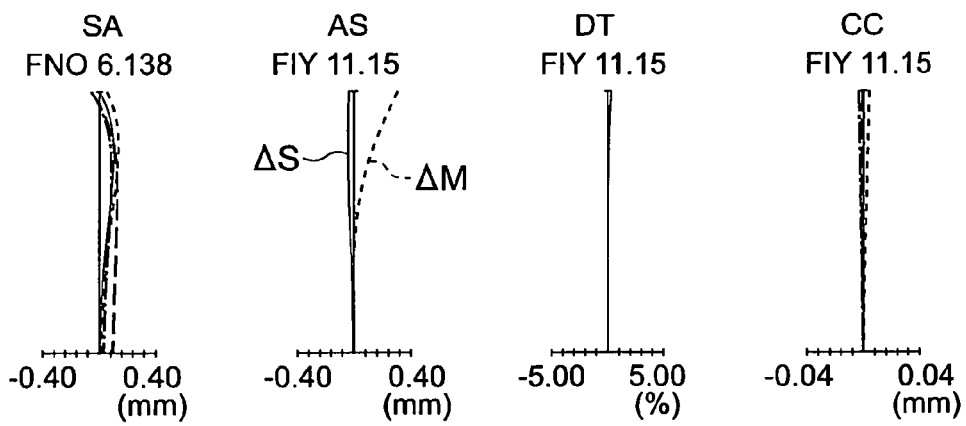

FIG. 11A, FIG. 11B, and FIG. 11C are diagrams showing a spherical aberration, an astigmatism, a distortion, and a chromatic aberration of magnification at the time of infinite object point focusing of the image forming optical system according to the fourth embodiment, where, FIG. 11A shows a state at the wide angle end, FIG. 11B shows an intermediate focal length state, and FIG. 11C shows a state at the telephoto end.

Figure 12A:
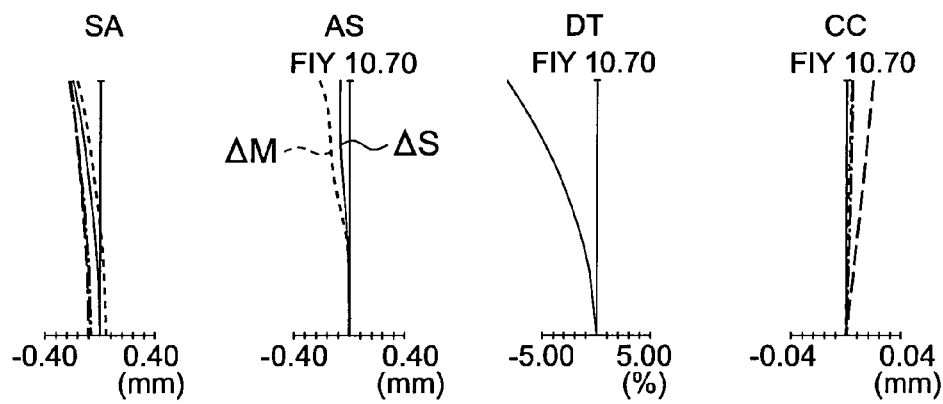
FIG. 12A, FIG. 12B, and FIG. 12C are diagrams showing the spherical aberration, the astigmatism, the distortion, and the chromatic aberration of magnification at the time of focusing at an object point which is 250 mm from the image plane according to the fourth embodiment, where.
Figure 12B:
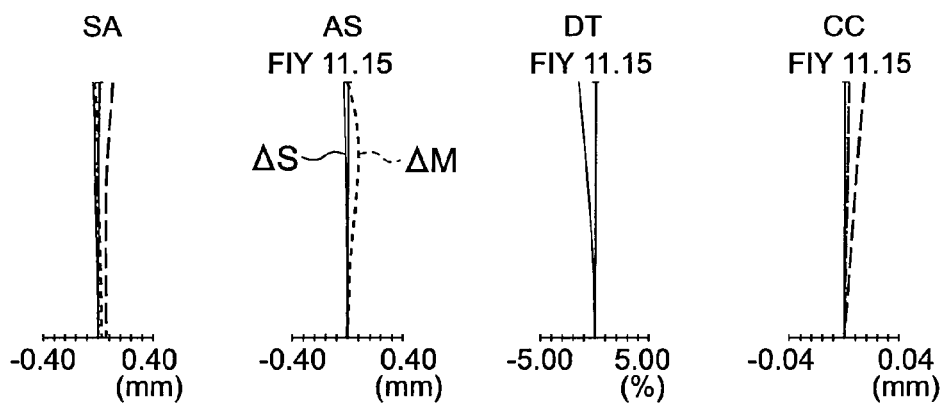
Figure 12C:
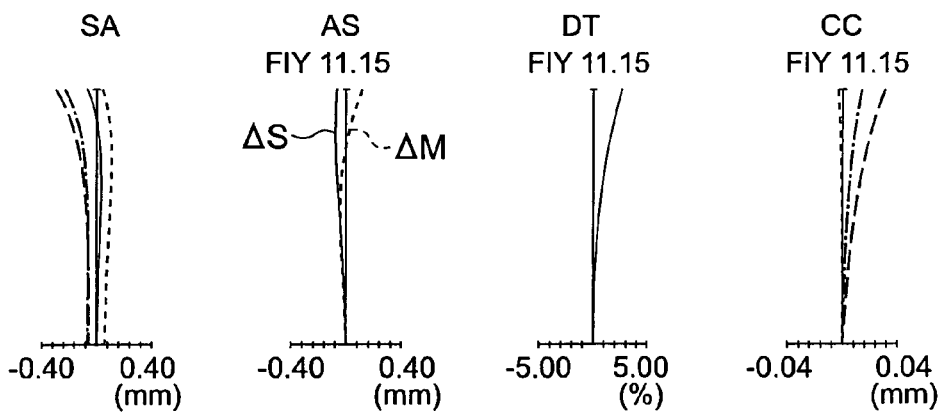

FIG. 12A, FIG. 12B, and FIG. 12C are diagrams showing the spherical aberration, the astigmatism, the distortion, and the chromatic aberration of magnification at the time of focusing at an object point which is 250 mm from the image plane according to the fourth embodiment, where, FIG. 12A shows a state at the wide angle end, FIG. 12B shows an intermediate state, and FIG. 12C shows a state at the telephoto end.

The image forming optical system according to the fourth embodiment, as shown in FIG. 10A, FIG. 10B, and FIG. 10C, includes in order from an object side, a first lens group G1 having a negative refractive power, a second lens group G2 having a positive refractive power, which includes an aperture stop S, a third lens group G3 having a negative refractive power, and a fourth lens group G4 having a positive refractive power.

The first lens group G1 includes in order from the object side, a negative meniscus lens L1 having a convex surface directed toward the object side, a negative meniscus lens L2 having a convex surface directed toward the object side, and a positive meniscus lens L3 having a convex surface directed toward the object side, and has a negative refractive power as a whole. Here, the negative meniscus lens L1 and the negative meniscus lens L2 are a negative sub-group, and the positive meniscus lens L3 is a positive sub-group.

The second lens group G2 includes in order from the object side, a biconvex positive lens L4, the aperture stop S, a cemented lens of a positive meniscus lens L5 having a convex surface directed toward the object side and a negative meniscus lens L6 having a convex surface directed toward the object side, a negative meniscus lens L7 having a convex surface directed toward the object side, a positive meniscus lens L8 having a convex surface directed toward the object side, and a positive meniscus lens L9 having a convex surface directed toward the object side, and has a positive refractive power as a whole. In the second lens group G2, an air lens having a meniscus shape is disposed between the negative meniscus lens L6 and the negative meniscus lens L7, the negative meniscus lens L7 and the positive meniscus lens L8, and the positive meniscus lens L8 and the positive meniscus lens L9.

The third lens group G3 includes a cemented lens of a negative meniscus lens L10 having a convex surface directed toward the object side and a positive meniscus lens L11 having a convex surface directed toward the object side, in order from the object side, and has a negative refractive power as a whole.

The fourth lens group G4 includes a positive meniscus lens L12 having a convex surface directed toward an image side, and has a positive refractive power as a whole.

At the time of zooming from the wide angle end to the telephoto end, the first lens group G1 is fixed and does not move. The second lens group G2 moves toward the object side while narrowing a distance from the first lens group G1. The third lens group G3 moves toward the object side while narrowing a distance from the second lens group G2, from the wide angle end up to the intermediate state, and moves slightly toward the object side while widening the distance from the second lens group G2, from the intermediate state up to the telephoto end. Moreover, the third lens group G3, at the time of focusing from infinity to a close point, moves toward the image side while widening a distance from the second lens group G2. The fourth lens group G4 is fixed and does not move.

An aspheric surface is provided to five surfaces namely, a surface on the image side of the negative meniscus lens L2 on the image side in the first lens group G1, a surface on the object side of the positive meniscus lens L5 of the cemented lens and both surfaces of the positive meniscus lens L9 nearest to the image side in the second lens group G2, and a surface on the image side of the positive meniscus lens L11 in the third lens group G3.

Next, an image forming optical system according to a fifth embodiment of the present invention will be described below. FIG. 13A, FIG. 13B, and FIG. 13C are cross-sectional views along an optical axis showing an optical arrangement at the time of infinite object point focusing of the image forming optical system according to the fifth embodiment of the present invention, where, FIG. 13A shows a state at a wide angle end, FIG. 13B shows an intermediate focal length state, and FIG. 13C shows a state at a telephoto end.

Figure 14A:
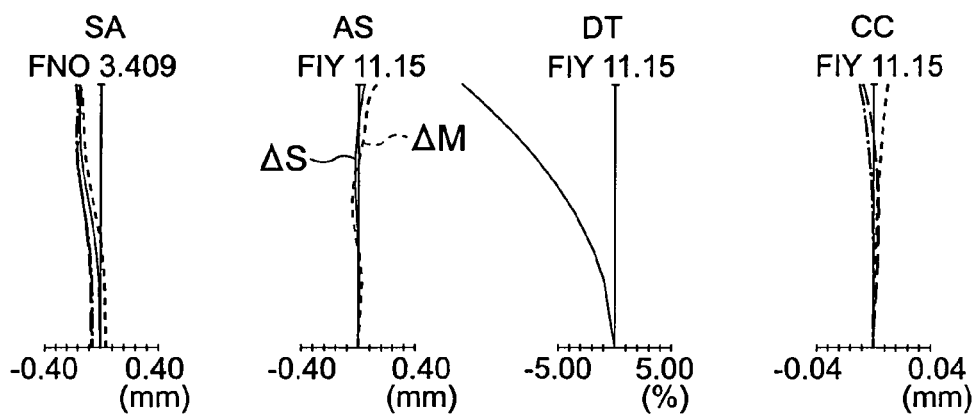
FIG. 14A, FIG. 14B, and FIG. 14C are diagrams showing a spherical aberration, an astigmatism, a distortion, and a chromatic aberration of magnification at the time of infinite object point focusing of the image forming optical system according to the fifth embodiment, where.
Figure 14B:
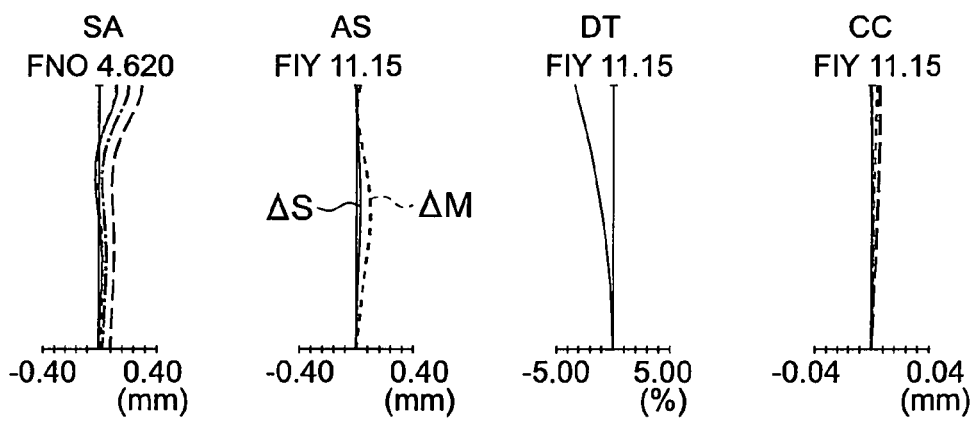
Figure 14C:
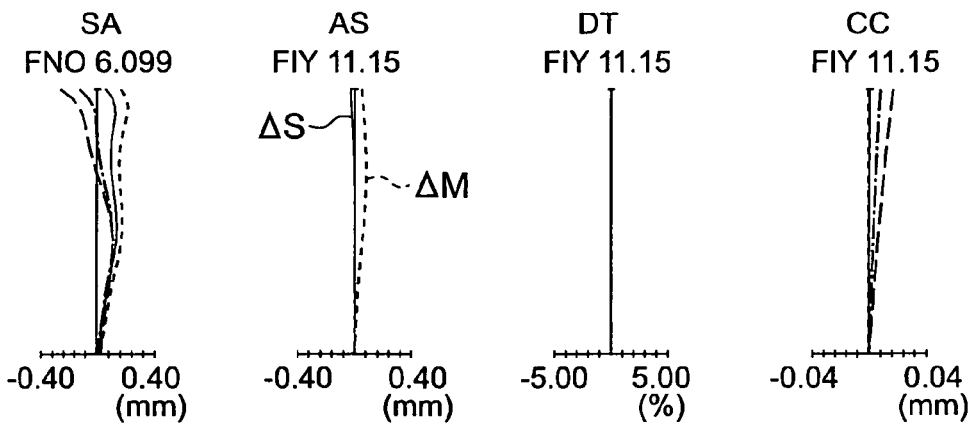

FIG. 14A, FIG. 14B, and FIG. 14C are diagrams showing a spherical aberration, an astigmatism, a distortion, and a chromatic aberration of magnification at the time of infinite object point focusing of the image forming optical system according to the fifth embodiment, where, FIG. 14A shows a state at the wide angle end, FIG. 14B shows an intermediate focal length state, and FIG. 14C shows a state at the telephoto end.

Figure 15A:
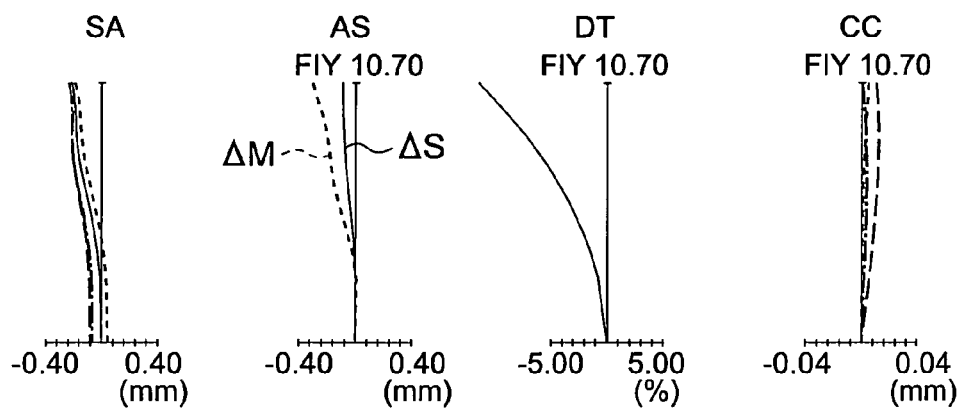
FIG. 15A, FIG. 15B, and FIG. 15C are diagrams showing the spherical aberration, the astigmatism, the distortion, and the chromatic aberration of magnification at the time of focusing at an object point which is 250 mm from the image plane according to the fifth embodiment, where.
Figure 15B:
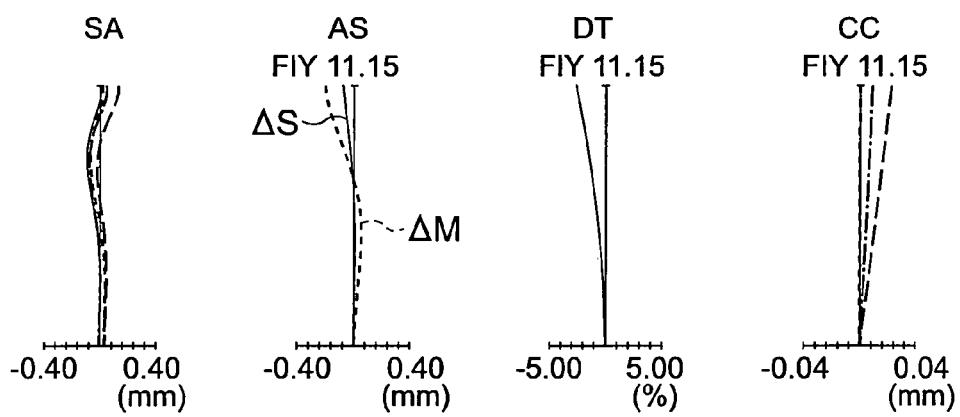
Figure 15C:
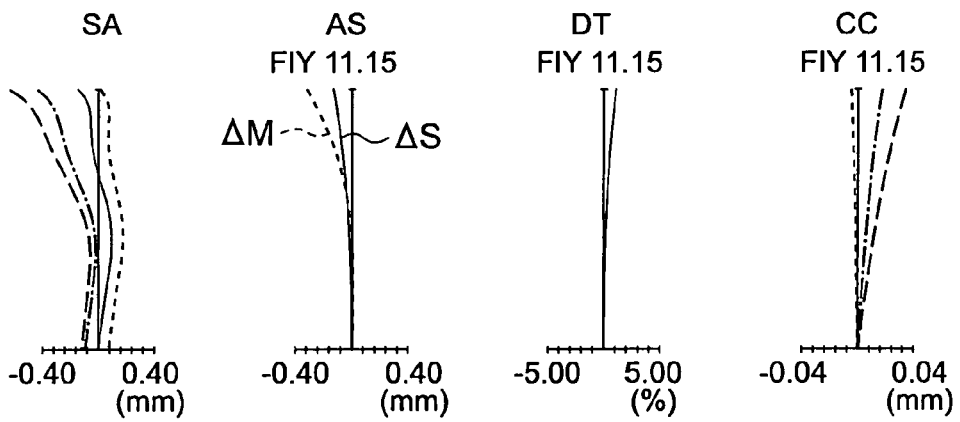

FIG. 15A, FIG. 15B, and FIG. 15C are diagrams showing the spherical aberration, the astigmatism, the distortion, and the chromatic aberration of magnification at the time of focusing at an object point which is 250 mm from the image plane according to the fifth embodiment, where, FIG. 15A shows a state at the wide angle end, FIG. 15B shows an intermediate state, and FIG. 15C shows a state at the telephoto end.

The image forming optical system according to the fifth embodiment, as shown in FIG. 13A, FIG. 13B, and FIG. 13C, includes in order from an object side, a first lens group G1 having a negative refractive power, a second lens group G2 having a positive refractive power, which includes an aperture stop S, a third lens group G3 having a negative refractive power, and a fourth lens group G4 having a positive refractive power.

The first lens group G1 includes in order from the object side, a negative meniscus lens L1 having a convex surface directed toward the object side, a negative meniscus lens L2 having a convex surface directed toward the object side, and a positive meniscus lens L3 having a convex surface directed toward the object side, and has a negative refractive power as a whole. Here, the negative meniscus lens L1 and the negative meniscus lens L2 are a negative sub-group, and the positive meniscus lens L3 is a positive sub-group.

The second lens group G2 includes in order from the object side, a positive meniscus lens L4 having a convex surface directed toward the image side, a cemented lens of the biconvex positive lens L5 and a biconcave negative lens L6, the aperture stop S, a negative meniscus lens L7 having a convex surface directed toward the object side, a cemented lens of a biconvex positive lens L8 and a biconcave negative lens L9, and a biconvex positive lens L10, and has a positive refractive power as a whole. In the second lens group G2, an air lens having a meniscus shape is disposed between the negative meniscus lens L7 and the biconvex positive lens L8, and between the biconcave negative lens L9 and the biconvex positive lens L10.

The third lens group G3 includes a cemented lens of a negative meniscus lens L11 having a convex surface directed toward the object side and a positive meniscus lens L12 having a convex surface directed toward the object side, in order from the object side, and has a negative refractive power as a whole.

The fourth lens group G4 includes a positive meniscus lens L13 having a convex surface directed toward an image side, and has a positive refractive power as a whole.

At the time of zooming from the wide angle end to the telephoto end, the first lens group G1 is fixed and does not move. The second lens group G2 moves toward the object side while narrowing a distance from the first lens group G1. The third lens group G3 moves toward the object side while narrowing a distance from the second lens group, from the wide angle end up to the intermediate state, and moves slightly toward the object side while widening the distance from the second lens group G2, from the intermediate state to the telephoto end. Moreover, the third lens group G3, at the time of focusing from infinity to a close point, moves toward the image side while widening a distance from the second lens group G2. The fourth lens group G4 is fixed and does not move.

An aspheric surface is provided to five surfaces namely a surface on the image side of the negative meniscus lens L2 on the image side in the first lens group G1, surface on the object side of the biconvex positive lens L5 nearest to the object side of the cemented lens and both surfaces of the biconvex positive lens L10 nearest to the image side in the second lens group G2, and a surface on the image side of the positive meniscus lens L12 in the third lens group G3.

Figure 16A:
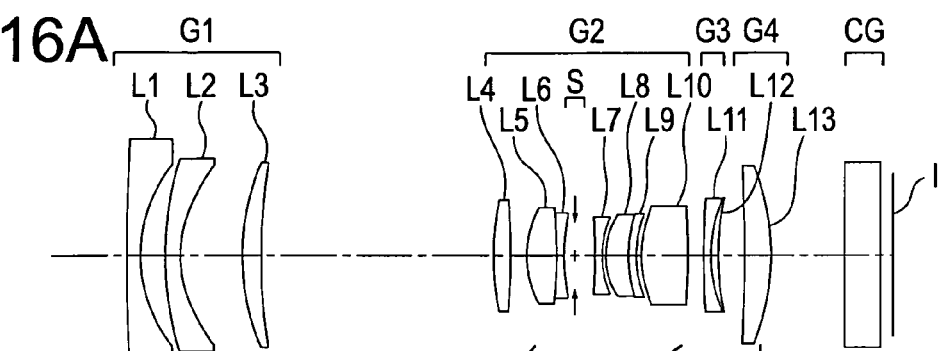
FIG. 16A, FIG. 16B, and FIG. 16C are cross-sectional views along an optical axis showing an optical arrangement at the time of infinite object point focusing of an image forming optical system according to a sixth embodiment of the present invention, where.
Figure 16B:
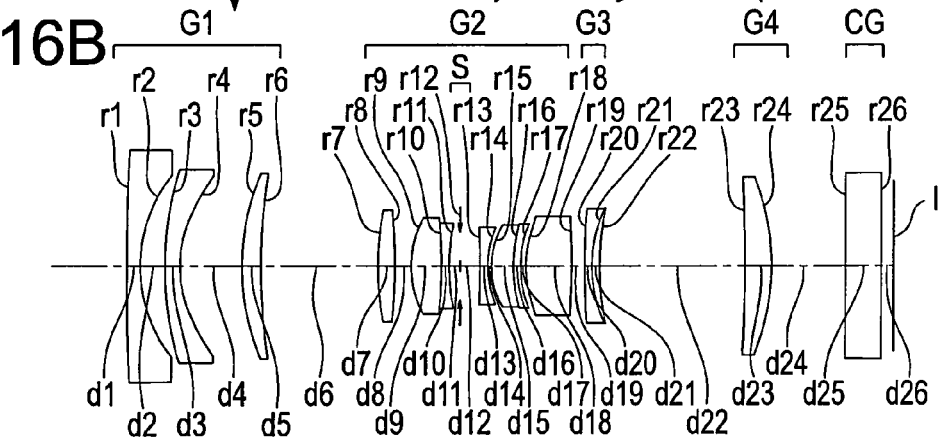
Figure 16C:
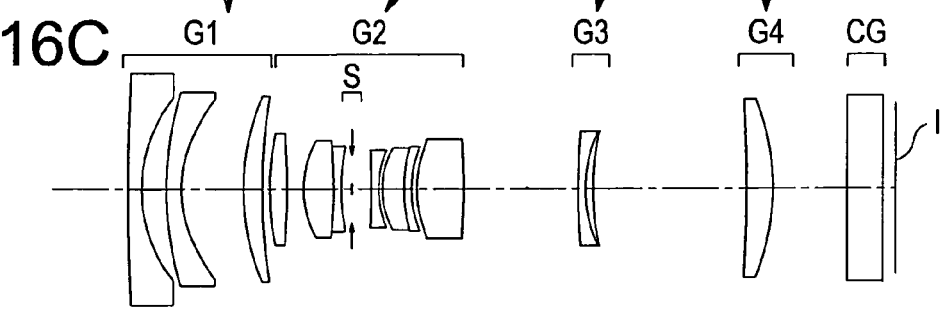

Next, an image forming optical system according to a sixth embodiment of the present invention will be described below. FIG. 16A, FIG. 16B, and FIG. 16C are cross-sectional views along an optical axis showing an optical arrangement at the time of infinite object point focusing of the image forming optical system according to the sixth embodiment of the present invention, where, FIG. 16A shows a state at a wide angle end, FIG. 16B shows an intermediate focal length state, and FIG. 16C shows a state at a telephoto end.

Figure 17A:
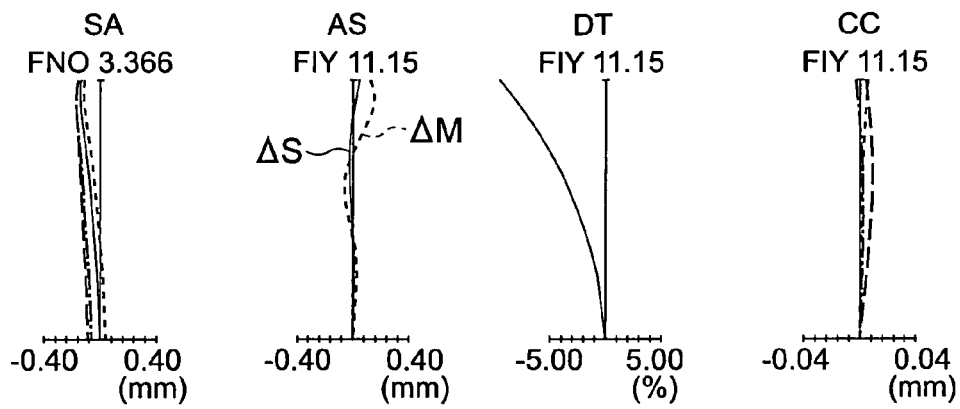
FIG. 17A, FIG. 17B, and FIG. 17C are diagrams showing a spherical aberration, an astigmatism, a distortion, and a chromatic aberration of magnification at the time of infinite object point focusing of the image forming optical system according to the sixth embodiment, where.
Figure 17B:
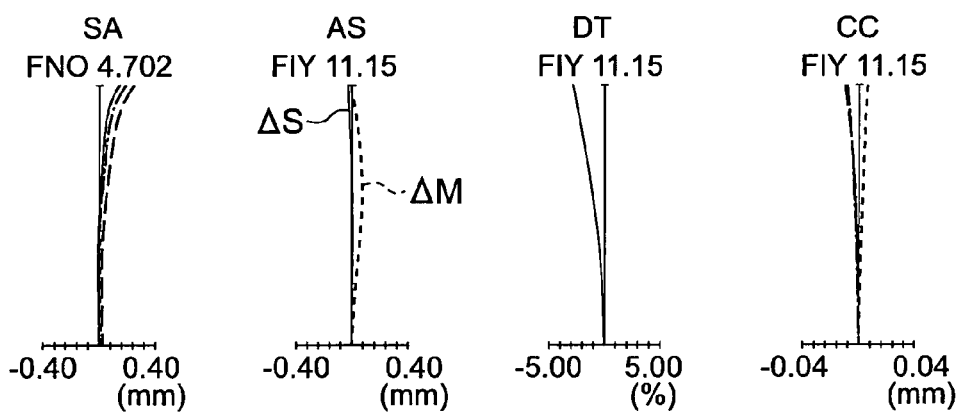
Figure 17C:
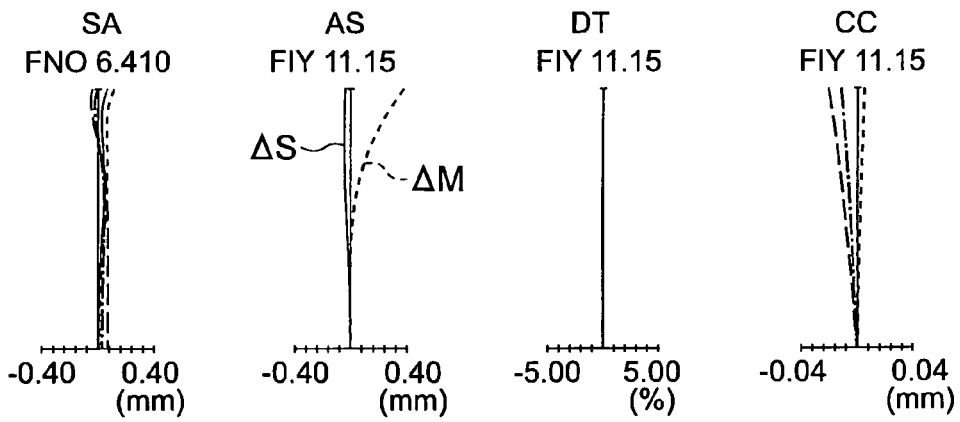

FIG. 17A, FIG. 17B, and FIG. 17C are diagrams showing a spherical aberration, an astigmatism, a distortion, and a chromatic aberration of magnification at the time of infinite object point focusing of the image forming optical system according to the sixth embodiment, where, FIG. 17A shows a state at the wide angle end, FIG. 17B shows an intermediate focal length state, and FIG. 17C shows a state at the telephoto end.

Figure 18A:
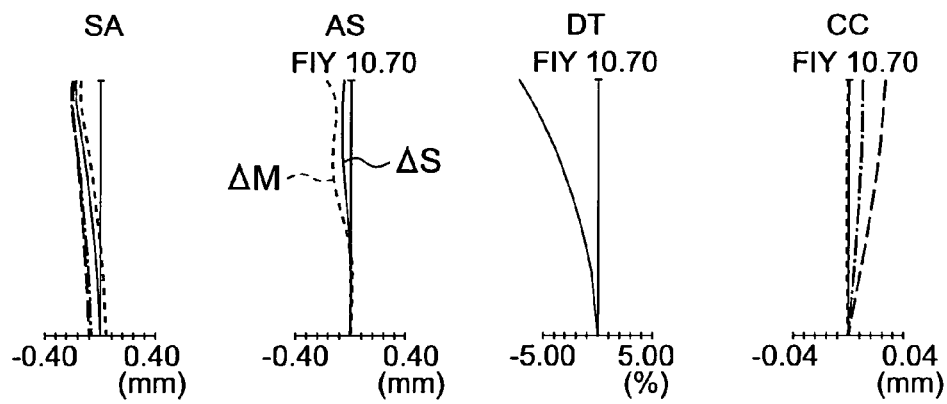
FIG. 18A, FIG. 18B, and FIG. 18C are diagrams showing the spherical aberration, the astigmatism, the distortion, and the chromatic aberration of magnification at the time of focusing at an object point which is 250 mm form the image plane according to the sixth embodiment, where.
Figure 18B:
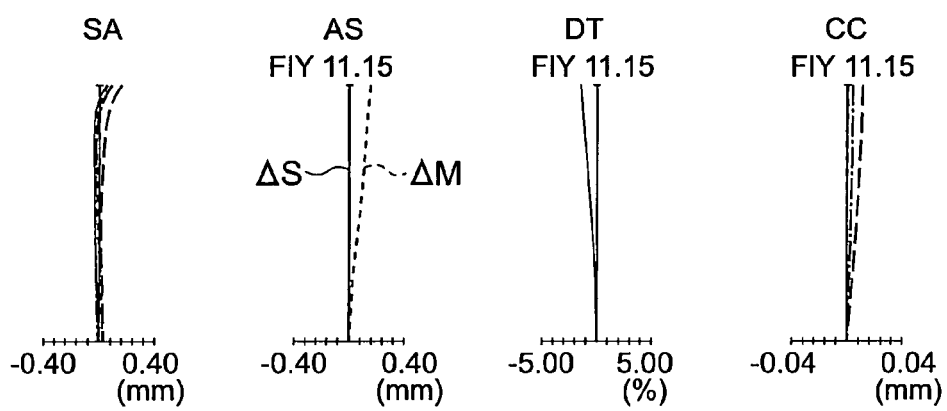
Figure 18C:
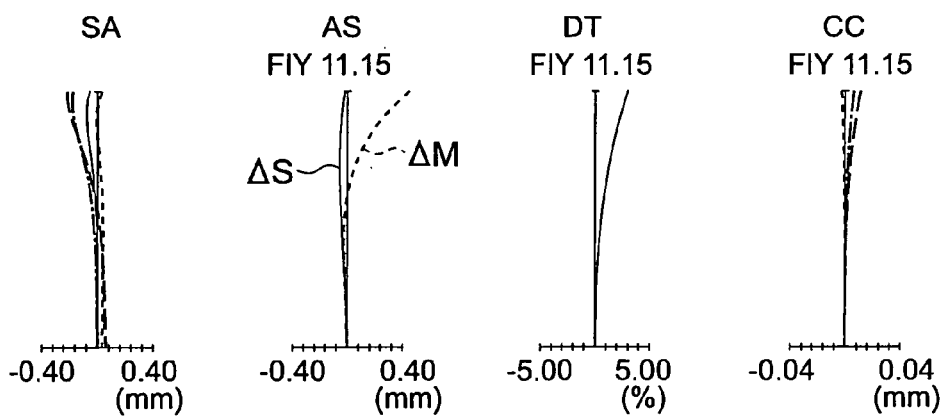

FIG. 18A, FIG. 18B, and FIG. 18C are diagrams showing the spherical aberration, the astigmatism, the distortion and the chromatic aberration of magnification at the time of focusing at an object point which is 250 mm from the image plane according to the sixth embodiment, where, FIG. 18A shows a state at the wide angle end, FIG. 18B shows an intermediate state, and FIG. 18C shows a state at the telephoto end.

The image forming optical system according to the sixth embodiment, as shown in FIG. 16A, FIG. 16B, and FIG. 16C, includes in order from an object side, a first lens group G1 having a negative refractive power, a second lens group G2 having a positive refractive power, which includes an aperture stop S, a third lens group G3 having a negative refractive power, and a fourth lens group G4 having a positive refractive power.

The first lens group G1 includes in order from the object side, a negative meniscus lens L1 having a convex surface directed toward the object side, a negative meniscus lens L2 having a convex surface directed toward the object side, and a positive meniscus lens L3 having a convex surface directed toward the object side, and has a negative refractive power as a whole. Here, the negative meniscus lens L1 and the negative meniscus lens L2 are a negative sub-group, and a positive meniscus lens L3 is a positive sub-group.

The second lens group G2 includes in order from the object side, a biconvex positive lens L4, a cemented lens of a biconvex positive lens L5 and a biconcave negative lens L6, the aperture stop S, a biconcave negative lens L7, a cemented lens of a positive meniscus lens L8 having a convex surface directed toward the object side and a negative meniscus lens L9 having a convex surface directed toward the object side, and a biconvex positive lens L10, and has a positive refractive power as a whole. In the second lens group G2, an air lens having a meniscus shape is disposed between the biconcave negative lens L7 and the positive meniscus lens L8, and between the negative meniscus lens L9 and the biconvex positive lens L10.

The third lens group G3 includes a cemented lens of a negative meniscus lens L11 having a convex surface directed toward the object side and a positive meniscus lens L12 having a convex surface directed toward the object side, in order from the object side, and has a negative refractive power as a whole.

The fourth lens group G4 includes a positive meniscus lens L13 having a convex surface directed toward an image side, and has a positive refractive power as a whole.

At the time of zooming from the wide angle end to the telephoto end, the first lens group G1 is fixed and does not move. The second lens group G2 moves toward the object side while narrowing a distance from the first lens group G1. The third lens group G3 moves toward the object side while narrowing a distance from the second lens group G2, from the wide angle end up to the intermediate state, and moves slightly toward the object side while widening the distance from the second lens group G2, from the intermediate state up to the telephoto end. Moreover, the third lens group G3, at the time of focusing from infinity to a close point, moves toward the image side while widening a distance from the second lens group G2. The fourth lens group G4 is fixed and does not move.

An aspheric surface is provided to five surfaces namely, a surface on the image side of the negative meniscus lens L2 on the image side in the first lens group G1, a surface on the object side of the biconvex positive lens L5 which is second from the object side of the cemented lens, and both surfaces of the biconvex positive lens L10 nearest to the image side in the second lens group G2, and a surface on the image side of the positive meniscus lens L12 in the third lens group G3.

Numerical data of each embodiment described above is shown below. Each of r1, r2, . . . denotes radius of curvature of each lens surface, each of d1, d2, . . . denotes lens thickness or an air distance between two lenses, each of nd1, nd2, . . . denotes a refractive index of each lens for a d-line, each of vd1, vd2, . . . denotes an Abbe's number for each lens, $F_{NO}$ denotes an F number, f denotes a focal length of the entire zoom lens system, D0 denotes a distance from the object to the first surface of the lens system, R denotes radius of curvature of each lens surface, D denotes each lens thickness or an air distance between two lenses, Nd denotes a refractive index of each lens for a d-line, and vd denotes an Abbe's number for each lens. Further, * denotes an aspheric data, and STOP denotes an aperture stop.

When z is let to be in an optical axis direction, y is let to be in a direction orthogonal to the optical axis, K denotes a conical coefficient, A4, A6, A8, and A10 denote aspherical surface coefficients, a shape of the aspheric surface is described by the following expression.

$$z=(y^2/r)/[1+\{1-(K+1)(y/r)^2\}^{1/2}]+A_4y^4+A_6y^6+A_8y^8+A_{10}y^{10}+A_{12}y^{12} \quad (I)$$

where e indicates '$10^{-1}$'. These reference signs are common in numeral data of after-mentioned each embodiment.

Example 1

| Unit mm | | | | |
|---|---|---|---|---|
| Surface data | | | | |
| Surface no. | r | d | nd | vd |
| Object plane | ∞ | ∞ | | |
| 1 | 69.314 | 1.85 | 1.77250 | 49.60 |
| 2 | 22.006 | 3.47 | | |
| 3 | 95.404 | 2.00 | 1.58313 | 59.38 |
| 4* | 14.459 | 8.64 | | |
| 5 | 27.266 | 2.50 | 1.84666 | 23.78 |
| 6 | 49.210 | Variable | | |
| 7 | 55.298 | 4.58 | 1.88300 | 40.76 |
| 8 | −61.934 | 1.60 | | |
| 9 (stop) | ∞ | 0.90 | | |
| 10* | 11.837 | 4.00 | 1.49700 | 81.54 |
| 11 | −133.102 | 1.00 | 1.91082 | 35.25 |
| 12 | 20.401 | 3.57 | | |
| 13 | −120.123 | 1.00 | 1.59270 | 35.31 |
| 14 | 14.620 | 0.40 | | |
| 15 | 10.841 | 4.00 | 1.51742 | 52.43 |
| 16 | 14.806 | 0.58 | | |
| 17* | 14.110 | 5.66 | 1.49700 | 81.61 |
| 18* | −55.308 | Variable | | |
| 19 | 159.991 | 1.00 | 1.83400 | 37.16 |
| 20 | 24.088 | 0.80 | 1.63387 | 23.38 |
| 21* | 47.331 | Variable | | |
| 22 | −199.505 | 2.90 | 1.78590 | 44.20 |
| 23 | −37.085 | 10.00 | | |
| 24 | ∞ | 4.80 | 1.51633 | 64.14 |
| 25 | ∞ | 1.60 | | |
| Image plane(Light receiving surface) ∞ | | | | |

| Unit mm |
|---|
| Aspherical surface data |

4th surface

K = −0.538
A4 = −7.10000e−07, A6 = −1.78954e−07, A8 = 2.57361e−09,
A10 = −1.81715e−11, A12 = 4.84106e−14
10th surface K = −0.208
A4 = 2.97944e−05, A6 = 2.12460e−07, A8 = 1.03585e−09,
A10 = 5.07425e−11
17th surface K = −2.601
A4 = −3.24893e−05, A6 = −8.37425e−07, A8 = −3.47475e−08,
A10 = 6.59903e−12
18th surface K = 9.138
A4 = 5.12618e−05, A6 = 2.35069e−07, A8 = −3.10870e−08,
A10 = 2.70639e−10
21st surface K = 0.000
A4 = 6.27939e−06

| Various data | | | |
|---|---|---|---|
| | Wide angle | Intermediate | Telephoto |
| Focal length | 14.30 | 24.21 | 41.16 |
| Fno. | 3.57 | 4.59 | 6.04 |
| Angle of field 2ω | 78.70 | 50.60 | 30.31 |
| At in-focus for infinity object | | | |
| d0 | ∞ | ∞ | ∞ |
| d6 | 30.45 | 15.30 | 1.00 |
| d18 | 2.43 | 1.74 | 14.63 |
| d21 | 4.23 | 20.15 | 21.53 |
| At the time of focusing at an object point which is 250 mm from the image plane | | | |
| d0 | 145.99 | 146.02 | 146.00 |
| d6 | 30.45 | 15.30 | 1.00 |
| d18 | 4.76 | 5.56 | 26.76 |
| d21 | 1.90 | 16.34 | 9.41 |

Example 2

| Unit mm | | | | |
|---|---|---|---|---|
| Surface data | | | | |
| Surface no. | r | d | nd | vd |
| Object plane | ∞ | ∞ | | |
| 1 | 122.544 | 2.22 | 1.77250 | 49.60 |
| 2 | 20.999 | 3.26 | | |
| 3 | 87.781 | 1.64 | 1.58313 | 59.38 |
| 4* | 14.775 | 8.06 | | |
| 5 | 27.761 | 2.25 | 1.84666 | 23.78 |
| 6 | 54.710 | Variable | | |
| 7 | 55.298 | 3.01 | 1.88300 | 40.76 |
| 8 | −72.263 | 2.61 | | |
| 9 (stop) | ∞ | 1.88 | | |
| 10* | 13.045 | 4.18 | 1.49700 | 81.54 |
| 11 | −36.446 | 0.99 | 1.91082 | 35.25 |
| 12 | 25.454 | 3.75 | | |
| 13 | 73.133 | 1.41 | 1.59270 | 35.31 |
| 14 | 16.254 | 0.40 | | |
| 15 | 11.468 | 3.69 | 1.51742 | 52.43 |

-continued

Unit mm

| | | | | |
|---|---|---|---|---|
| 16 | 16.935 | 0.48 | | |
| 17* | 16.209 | 5.19 | 1.49700 | 81.61 |
| 18* | −98.578 | Variable | | |
| 19 | 721.350 | 1.00 | 1.83400 | 37.16 |
| 20 | 23.547 | 0.80 | 1.63387 | 23.38 |
| 21* | 62.069 | Variable | | |
| 22 | −91.270 | 4.09 | 1.78590 | 44.20 |
| 23 | −34.762 | 10.00 | | |
| 24 | ∞ | 4.80 | 1.51633 | 64.14 |
| 25 | ∞ | 1.50 | | |
| Image plane(Light receiving surface) ∞ | | | | |

Aspherical surface data

4th surface

K = −0.615
A4 = 5.56263e−06, A6 = −2.88935e−07, A8 = 4.47855e−09,
A10 = −2.99501e−11, A12 = 7.07912e−14

10th surface

K = −0.217
A4 = 3.97596e−05, A6 = 1.29567e−07, A8 = 5.98105e−09,
A10 = −2.30087e−11

17th surface

K = −2.600
A4 = −4.12586e−05, A6 = −4.64278e−08, A8 = −4.14309e−08,
A10 = 2.95789e−10

18th surface

K = 9.152
A4 = 6.16742e−05, A6 = 6.03528e−07, A8 = −2.84514e−08,
A10 = 2.78660e−10

21st surface

K = 0.000
A4 = 4.38655e−06

Various data

| | Wide angle | Intermediate | Telephoto |
|---|---|---|---|
| Focal length | 14.27 | 24.11 | 41.05 |
| Fno. | 3.57 | 4.66 | 6.32 |
| Angle of field 2ω | 81.79 | 51.45 | 30.56 |
| At in-focus for infinity object | | | |
| d0 | ∞ | ∞ | ∞ |
| d6 | 29.73 | 15.00 | 1.01 |
| d18 | 2.43 | 2.08 | 14.75 |
| d21 | 4.25 | 19.32 | 20.60 |
| At the time of focusing at an object point which is 250 mm from the image plane | | | |
| d0 | 146.07 | 146.19 | 146.24 |
| d6 | 29.73 | 15.00 | 1.01 |
| d18 | 4.33 | 5.21 | 24.52 |
| d21 | 2.36 | 16.19 | 10.83 |

Example 3

Unit mm

Surface data

| Surface no. | r | d | nd | νd |
|---|---|---|---|---|
| Object plane | ∞ | ∞ | | |
| 1 | 343.458 | 2.70 | 1.77250 | 49.60 |
| 2 | 22.253 | 2.65 | | |
| 3 | 56.701 | 2.32 | 1.58313 | 59.38 |

-continued

Unit mm

| | | | | |
|---|---|---|---|---|
| 4* | 12.937 | 7.41 | | |
| 5 | 26.735 | 2.99 | 1.84666 | 23.78 |
| 6 | 55.317 | Variable | | |
| 7 | 55.298 | 1.80 | 1.88300 | 40.76 |
| 8 | −76.372 | 3.72 | | |
| 9 (stop) | ∞ | 1.89 | | |
| 10* | 13.655 | 4.41 | 1.49700 | 81.54 |
| 11 | −25.749 | 1.07 | 1.91082 | 35.25 |
| 12 | 24.162 | 0.54 | | |
| 13 | 32.987 | 1.26 | 1.59270 | 35.31 |
| 14 | 16.457 | 0.40 | | |
| 15 | 9.944 | 2.99 | 1.51742 | 52.43 |
| 16 | 18.029 | 3.02 | | |
| 17* | 23.400 | 5.32 | 1.49700 | 81.61 |
| 18* | −70.906 | Variable | | |
| 19 | 715.284 | 1.00 | 1.83400 | 37.16 |
| 20 | 24.005 | 0.80 | 1.63400 | 22.88 |
| 21* | 56.715 | Variable | | |
| 22 | −60.709 | 4.60 | 1.78590 | 44.20 |
| 23 | −31.188 | 10.00 | | |
| 24 | ∞ | 4.80 | 1.51633 | 64.14 |
| 25 | ∞ | 1.50 | | |
| Image plane(Light receiving surface) ∞ | | | | |

Aspherical surface data

4th surface

K = −0.617
A4 = −4.41375e−06, A6 = −1.89647e−07, A8 = 3.00676e−09,
A10 = −2.64461e−11, A12 = 8.44972e−14

10th surface

K = −0.225
A4 = 4.72430e−05, A6 = 4.16369e−07, A8 = −9.11347e−10,
A10 = 1.54017e−10

17th surface

K = −2.601
A4 = −1.86279e−04, A6 = −1.12042e−06, A8 = −8.77066e−08,
A10 = 6.52665e−10

18th surface

K = 9.155
A4 = −7.64848e−06, A6 = −1.76583e−07, A8 = −4.93629e−08,
A10 = 7.06373e−10

21st surface

K = 0.000
A4 = 1.11691e−05

Various data

| | Wide angle | Intermediate | Telephoto |
|---|---|---|---|
| Focal length | 14.18 | 24.19 | 41.19 |
| Fno. | 3.57 | 4.70 | 6.37 |
| Angle of field 2ω | 82.58 | 51.46 | 30.47 |
| At in-focus for infinity object | | | |
| d0 | ∞ | ∞ | ∞ |
| d6 | 29.33 | 14.72 | 1.14 |
| d18 | 2.32 | 2.27 | 14.89 |
| d21 | 5.00 | 19.73 | 20.66 |
| At the time of focusing at an object point which is 250 mm from the image plane | | | |
| d0 | 145.98 | 146.07 | 146.06 |
| d6 | 29.33 | 14.72 | 1.14 |
| d18 | 3.97 | 5.05 | 23.54 |
| d21 | 3.35 | 16.95 | 12.01 |

Example 4

Unit mm

Surface data

| Surface no. | r | d | nd | vd |
|---|---|---|---|---|
| Object plane | ∞ | ∞ | | |
| 1 | 78.500 | 1.85 | 1.77250 | 49.60 |
| 2 | 23.518 | 3.43 | | |
| 3 | 132.555 | 2.00 | 1.58313 | 59.38 |
| 4* | 15.816 | 9.06 | | |
| 5 | 29.353 | 2.50 | 1.84666 | 23.78 |
| 6 | 52.958 | Variable | | |
| 7 | 53.976 | 3.86 | 1.88300 | 40.76 |
| 8 | −88.146 | 1.60 | | |
| 9 (stop) | ∞ | 0.90 | | |
| 10* | 11.857 | 4.00 | 1.49700 | 81.54 |
| 11 | 1107.663 | 1.00 | 1.91082 | 35.25 |
| 12 | 19.524 | 2.62 | | |
| 13 | 121.265 | 1.00 | 1.59270 | 35.31 |
| 14 | 13.881 | 0.40 | | |
| 15 | 10.534 | 4.00 | 1.51742 | 52.43 |
| 16 | 14.494 | 0.69 | | |
| 17* | 13.084 | 6.32 | 1.49700 | 81.61 |
| 18* | 464.994 | Variable | | |
| 19 | 88.090 | 1.00 | 1.83400 | 37.16 |
| 20 | 26.836 | 0.40 | 1.63387 | 23.38 |
| 21* | 34.866 | Variable | | |
| 22 | −211.481 | 2.90 | 1.78590 | 44.20 |
| 23 | −35.144 | 10.00 | | |
| 24 | ∞ | 4.80 | 1.51633 | 64.14 |
| 25 | ∞ | 1.50 | | |
| Image plane(Light receiving surface) ∞ | | | | |

Aspherical surface data

4th surface

K = −0.544
A4 = 1.42195e−07, A6 = −1.43353e−07, A8 = 1.73742e−09,
A10 = −9.13690e−12, A12 = 1.69301e−14

10th surface

K = −0.209
A4 = 2.72061e−05, A6 = 1.27547e−07, A8 = 2.58868e−09,
A10 = 2.63410e−11

17th surface

K = −2.603
A4 = 7.26890e−06, A6 = −1.07693e−06, A8 = −3.21463e−08,
A10 = −3.37906e−11

18th surface

K = 9.831
A4 = 7.38728e−05, A6 = 2.37049e−07, A8 = −3.23747e−08,
A10 = 2.78590e−10

21st surface

K = 0.000
A4 = 9.75011e−06

Various data

| | Wide angle | Intermediate | Telephoto |
|---|---|---|---|
| Focal length | 14.23 | 24.18 | 41.18 |
| Fno. | 3.57 | 4.59 | 6.14 |
| Angle of field 2ω | 79.41 | 50.78 | 30.21 |
| At in-focus for infinity object | | | |
| d0 | ∞ | ∞ | ∞ |
| d6 | 30.13 | 15.09 | 1.00 |
| d18 | 2.66 | 1.82 | 14.92 |
| d21 | 3.65 | 19.64 | 20.56 |

Unit mm

At the time of focusing at an object point which is 250 mm from the image plane

| | | | |
|---|---|---|---|
| d0 | 147.58 | 147.61 | 147.60 |
| d6 | 30.13 | 15.09 | 1.00 |
| d18 | 5.20 | 6.00 | 28.75 |
| d21 | 1.11 | 15.46 | 6.74 |

Example 5

Unit mm

Surface data

| Surface no. | r | d | nd | vd |
|---|---|---|---|---|
| Object plane | ∞ | ∞ | | |
| 1 | 274.350 | 1.85 | 1.77250 | 49.60 |
| 2 | 18.714 | 1.99 | | |
| 3 | 26.623 | 2.00 | 1.58313 | 59.38 |
| 4* | 12.602 | 7.00 | | |
| 5 | 23.262 | 3.00 | 1.84666 | 23.78 |
| 6 | 39.856 | Variable | | |
| 7 | −221.014 | 3.27 | 1.88300 | 40.76 |
| 8 | −44.875 | 1.04 | | |
| 9* | 15.000 | 3.50 | 1.49700 | 81.54 |
| 10 | −65.546 | 1.00 | 1.91082 | 35.25 |
| 11 | 177.982 | 1.12 | | |
| 12 (stop) | ∞ | 4.71 | | |
| 13 | 79.894 | 1.00 | 1.59270 | 35.31 |
| 14 | 14.622 | 0.40 | | |
| 15 | 12.452 | 4.50 | 1.51823 | 58.90 |
| 16 | −11.106 | 1.00 | 1.57099 | 50.80 |
| 17 | 26.263 | 2.24 | | |
| 18* | 41.644 | 4.14 | 1.49700 | 81.61 |
| 19* | −35.340 | Variable | | |
| 20 | 300.000 | 1.00 | 1.83400 | 37.16 |
| 21 | 28.527 | 0.55 | 1.63400 | 22.88 |
| 22* | 45.162 | Variable | | |
| 23 | −72.152 | 2.90 | 1.78590 | 44.20 |
| 24 | −33.405 | 10.00 | | |
| 25 | ∞ | 4.80 | 1.51633 | 64.14 |
| 26 | ∞ | 1.50 | | |
| Image plane(Light receiving surface) ∞ | | | | |

Aspherical surface data

4th surface

K = −0.537
A4 = −6.92670e−06, A6 = −2.58094e−07, A8 = 3.82201e−09,
A10 = −3.19383e−11, A12 = 9.17709e−14

9th surface

K = −0.210
A4 = 9.75486e−06, A6 = 2.75955e−07, A8 = −7.75648e−09,
A10 = 9.67231e−11

18th surface

K = −2.556
A4 = −1.37717e−04, A6 = −1.26386e−06, A8 = −2.07794e−08,
A10 = 1.02702e−10

19th surface

K = 8.611
A4 = −1.77705e−05, A6 = −1.04600e−06, A8 = 2.31812e−10

22nd surface

K = 0.000
A4 = 9.64550e−06

-continued

Unit mm

Various data

|  | Wide angle | Intermediate | Telephoto |
|---|---|---|---|
| Focal length | 14.32 | 24.18 | 41.13 |
| Fno. | 3.41 | 4.62 | 6.10 |
| Angle of field 2ω | 80.98 | 51.03 | 30.34 |

At in-focus for infinity object

| d0 | ∞ | ∞ | ∞ |
|---|---|---|---|
| d6 | 28.46 | 14.49 | 1.00 |
| d19 | 3.02 | 2.13 | 13.70 |
| d22 | 2.85 | 17.76 | 19.69 |

At the time of focusing at an object point which is 250 mm from the image plane

| d0 | 151.03 | 151.11 | 151.07 |
|---|---|---|---|
| d6 | 28.46 | 14.49 | 1.00 |
| d19 | 4.98 | 5.20 | 23.02 |
| d22 | 0.89 | 14.68 | 10.36 |

Example 6

Unit mm

Surface data

| Surface no. | r | d | nd | νd |
|---|---|---|---|---|
| Object plane | ∞ | ∞ | | |
| 1 | 297.950 | 1.85 | 1.77250 | 45.00 |
| 2 | 19.920 | 3.29 | | |
| 3 | 45.013 | 2.00 | 1.58313 | 59.38 |
| 4* | 16.010 | 8.29 | | |
| 5 | 32.171 | 2.50 | 1.84666 | 23.78 |
| 6 | 79.661 | Variable | | |
| 7 | 36.332 | 2.31 | 1.88300 | 40.76 |
| 8 | −96.327 | 2.19 | | |
| 9* | 13.839 | 4.00 | 1.49700 | 81.54 |
| 10 | −66.262 | 1.00 | 1.91082 | 35.25 |
| 11 | 25.898 | 1.43 | | |
| 12 (stop) | ∞ | 2.67 | | |
| 13 | −113.139 | 1.00 | 1.59270 | 35.31 |
| 14 | 12.543 | 0.49 | | |
| 15 | 10.536 | 3.00 | 1.51633 | 64.14 |
| 16 | 20.000 | 1.00 | 1.53172 | 48.84 |
| 17 | 15.249 | 0.67 | | |
| 18* | 13.789 | 6.16 | 1.49700 | 81.61 |
| 19* | −74.236 | Variable | | |
| 20 | 91.350 | 1.00 | 1.80100 | 34.97 |
| 21 | 18.744 | 1.00 | 1.63387 | 23.38 |
| 22* | 38.251 | Variable | | |
| 23 | −215.570 | 3.50 | 1.75700 | 47.82 |
| 24 | −32.474 | 10.00 | | |
| 25 | ∞ | 4.80 | 1.51633 | 64.14 |
| 26 | ∞ | 1.50 | | |
| Image plane(Light receiving surface) | ∞ | | | |

Aspherical surface data

4th surface

K = −0.538
A4 = −1.18539e−05, A6 = −2.04484e−07, A8 = 2.05490e−09,
A10 = −1.12439e−11, A12 = 2.24420e−14

9th surface

K = −0.210
A4 = 3.00565e−05, A6 = −8.44416e−08, A8 = 9.19833e−09,
A10 = −8.10982e−11

-continued

Unit mm

18th surface

K = −2.600
A4 = 2.65903e−06, A6 = 5.41781e−07, A8 = −7.03590e−08,
A10 = 6.75942e−10

19th surface

K = 9.138
A4 = 5.79735e−05, A6 = 1.07032e−06, A8 = −4.36785e−08,
A10 = 4.75773e−10

22nd surface

K = 0.000
A4 = 1.02400e−05

Various data

|  | Wide angle | Intermediate | Telephoto |
|---|---|---|---|
| Focal length | 14.38 | 24.25 | 41.23 |
| Fno. | 3.37 | 4.70 | 6.41 |
| Angle of field 2ω | 78.35 | 50.66 | 30.25 |

At in-focus for infinity object

| d0 | ∞ | ∞ | ∞ |
|---|---|---|---|
| d6 | 31.09 | 15.73 | 1.00 |
| d19 | 2.12 | 1.72 | 15.40 |
| d22 | 3.50 | 19.36 | 20.40 |

At the time of focusing at an object point which is 250 mm from the image plane

| d0 | 147.44 | 147.38 | 147.36 |
|---|---|---|---|
| d6 | 31.09 | 15.73 | 1.00 |
| d19 | 4.65 | 5.88 | 28.96 |
| d22 | 0.96 | 15.20 | 6.83 |

Values of conditional expression according to each embodiment are shown below.

| Conditional expression | | Example 1 | Example 2 | Example 3 |
|---|---|---|---|---|
| (1) | $N_{d3}$ | 1.63387 | 1.63387 | 1.63400 |
| (1) | $\nu_{d3}$ | 23.38 | 23.38 | 22.88 |
| (2) | | 4.800 | 4.480 | 4.111 |
| (3) | | 0.468 | 0.463 | 0.410 |
| (4) | | 0.943 | 1.029 | 1.088 |
| (5) | | −1.840 | −1.188 | −1.172 |
| (6) | | −1.354 | −1.067 | −1.069 |
| (7) | | −1.457 | −2.230 | −3.113 |
| (8) | Air lens 1 | −6.737 | −5.792 | 6.476 |
|  | Air lens 2 | −41.564 | −45.644 | −4.062 |
|  | Air lens 3 | — | — | 7.714 |

| Conditional expression | | Example 4 | Example 5 | Example 6 |
|---|---|---|---|---|
| (1) | $N_{d3}$ | 1.63387 | 1.63400 | 1.63387 |
| (1) | $\nu_{d3}$ | 23.38 | 22.88 | 23.38 |
| (2) | | 5.212 | 4.254 | 4.338 |
| (3) | | 0.481 | 0.442 | 0.462 |
| (4) | | 0.911 | 1.024 | 0.910 |
| (5) | | −2.310 | −1.354 | −2.441 |
| (6) | | −1.876 | −1.210 | −1.516 |
| (7) | | −1.399 | −2.782 | −1.354 |
| (8) | Air lens 1 | 1.352 | −12.472 | −11.494 |
|  | Air lens 2 | −7.106 | 4.415 | −19.878 |
|  | Air lens 3 | −26.413 | — | — |

As for the conditional expression (8), it is assumed that the Air lens 1, 2, and 3 are arranged in order from the object side.

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 19:
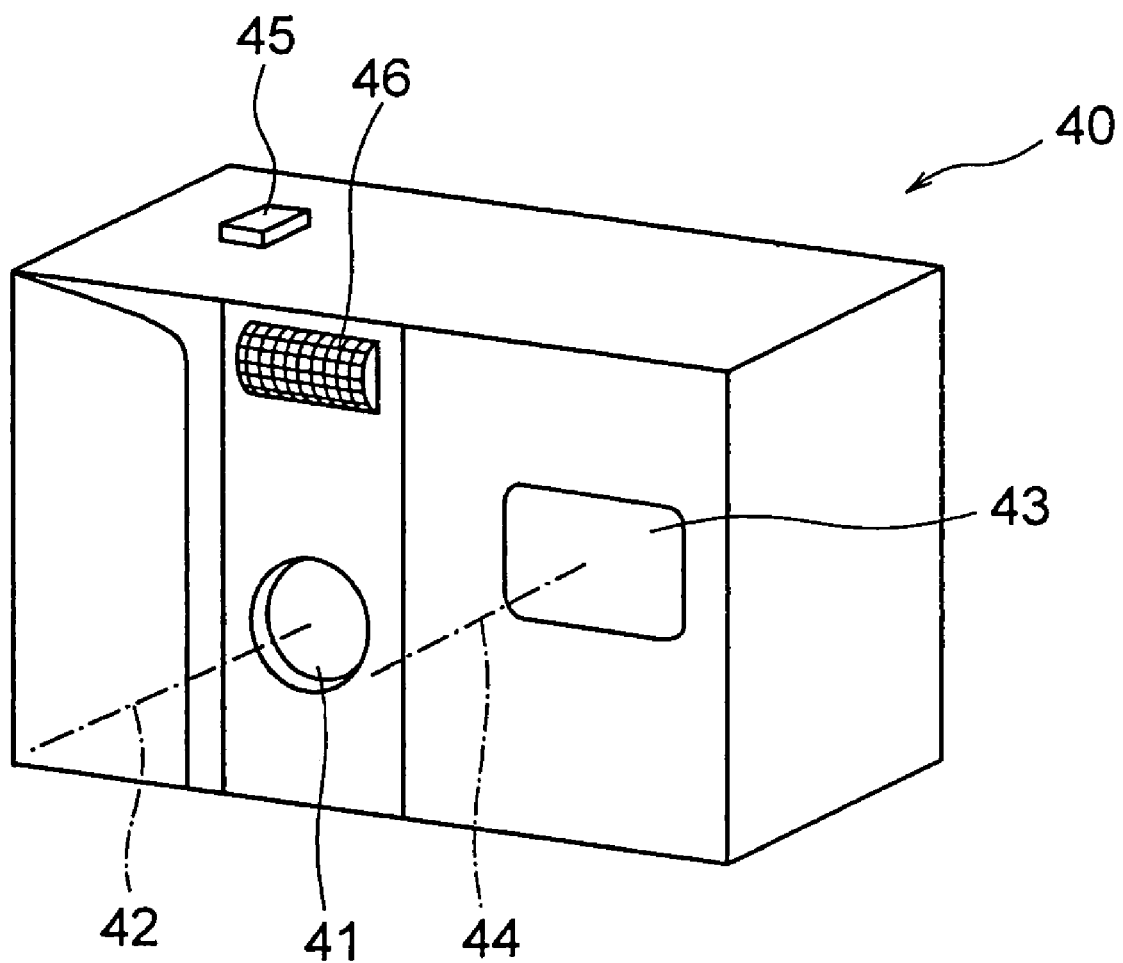
FIG. 19 is a front perspective view showing an appearance of a digital camera 40 in which, the image forming optical system according to the present invention is incorporated.
Figure 20:
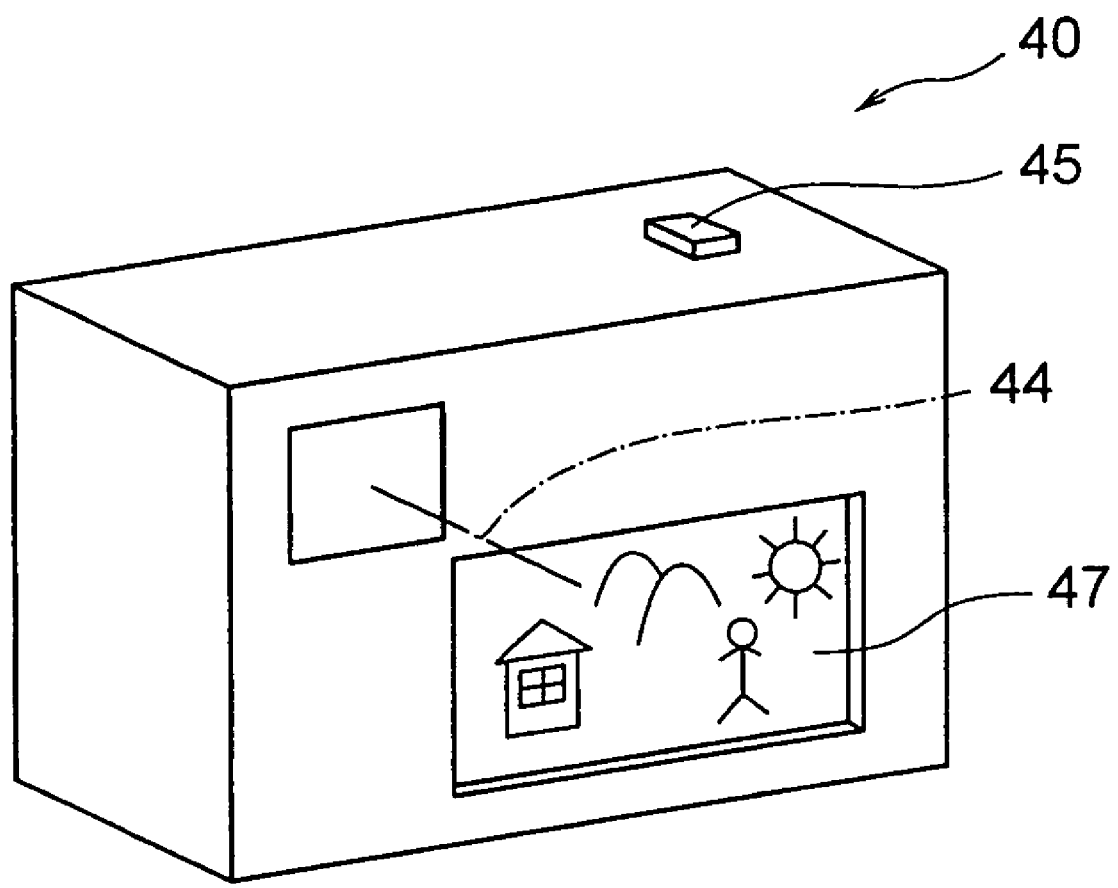
FIG. 20 is a rear perspective view of the digital camera 40.
Figure 21:
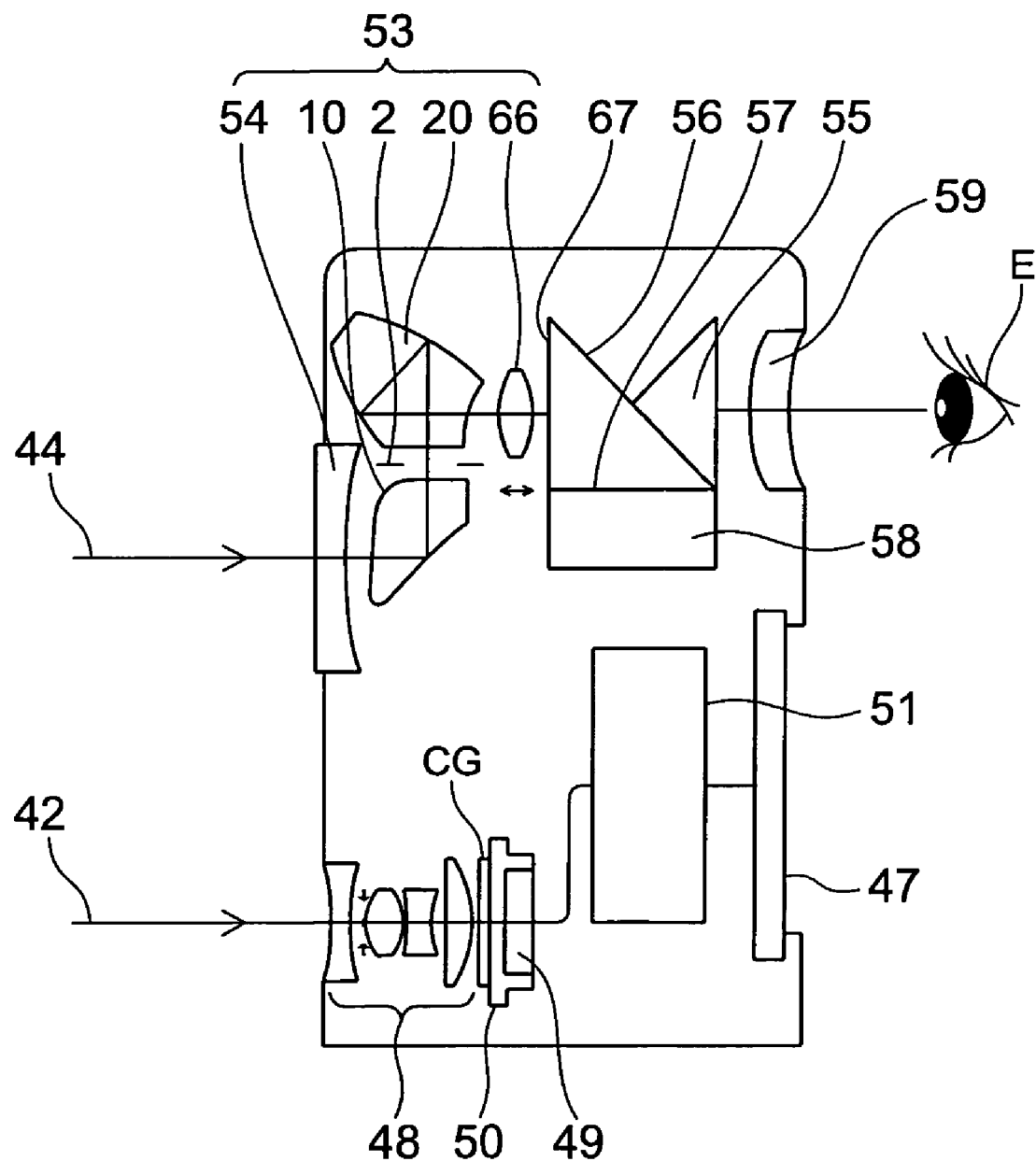
FIG. 21 is a cross-sectional view showing an optical arrangement of the digital camera 40.

In FIG. 19 to FIG. 21 show conceptual diagrams of structures in which the image forming optical system according to the present invention is incorporated in a photographic optical system 41 of a digital camera. FIG. 19 is a frontward perspective view showing an appearance of a digital camera 40, FIG. 20 is a rearward perspective view of the same, and FIG. 21 is a cross-sectional view showing an optical arrangement of the digital camera 40.

The digital camera 40, in a case of this example, includes the photographic optical system 41 having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 such as the zoom lens in the first embodiment.

An object image formed by the photographic optical system 41 is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced. Incidentally, the present invention could be applied to a bending type digital camera having a bending optical system, in addition to the above-mentioned collapsible type digital camera.

Figure 22:
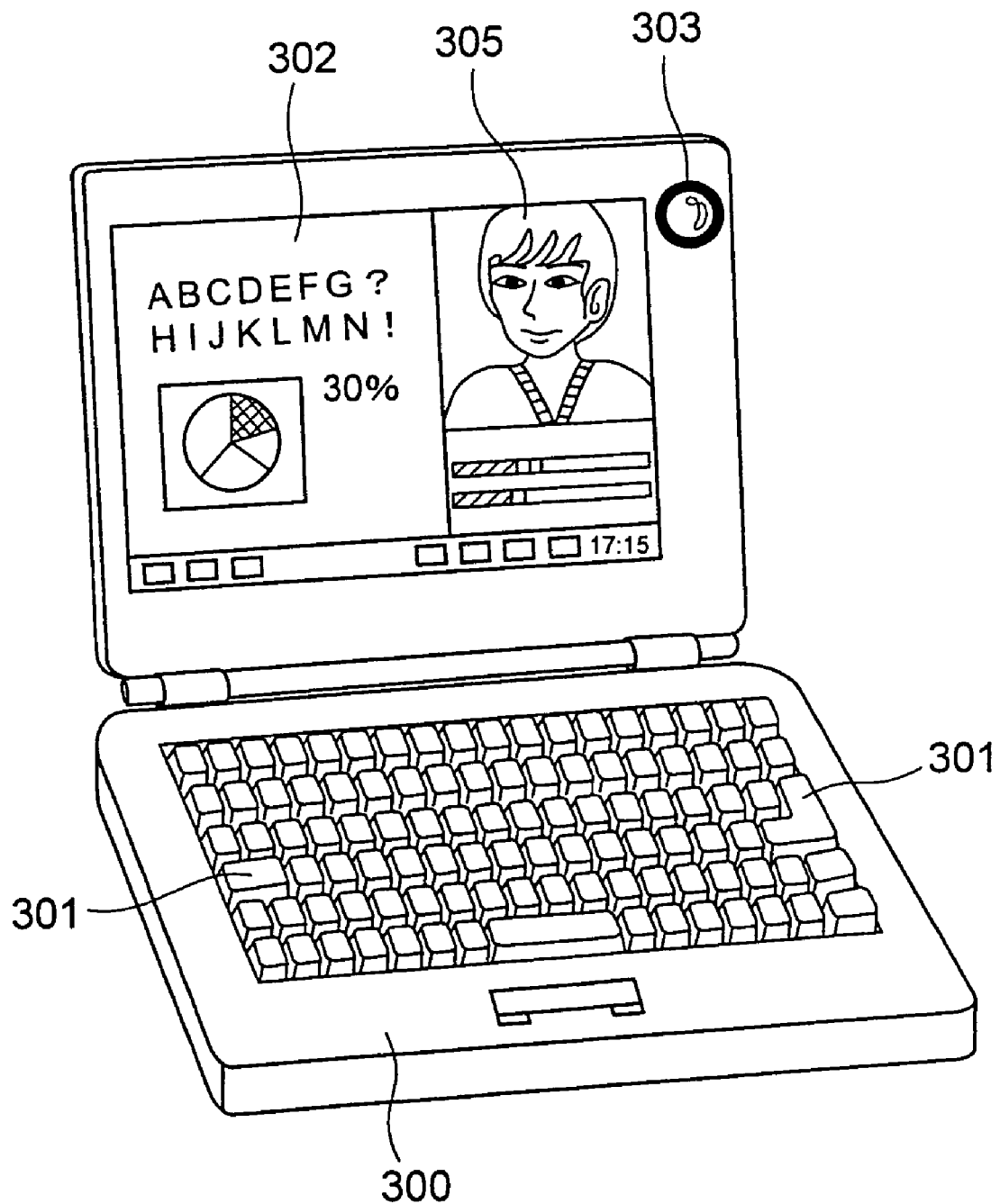
FIG. 22 is a front perspective view of a state in which, a cover of a personal computer 300 which is an example of an information processing apparatus in which, the image forming optical system of the present invention is built-in as an objective optical system, is opened.
Figure 23:
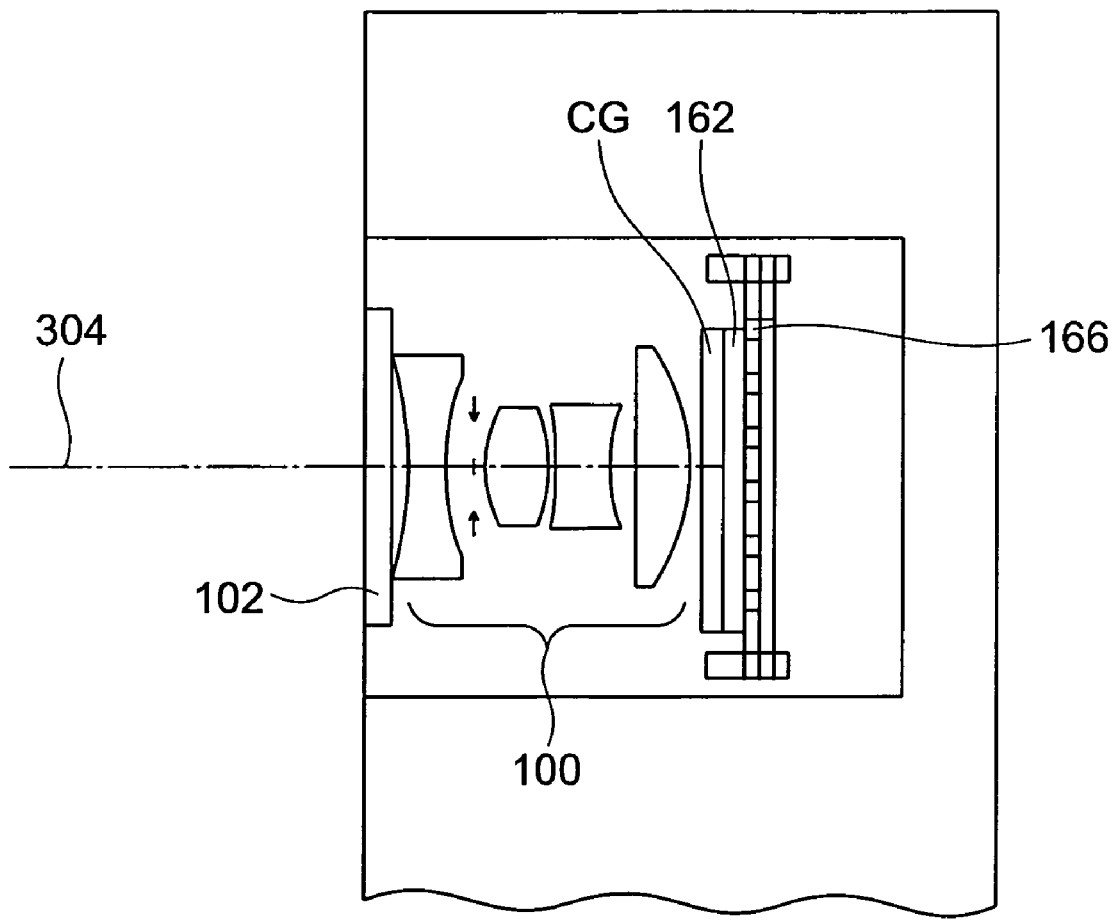
FIG. 23 is a cross-sectional view of a photographic optical system 303 of the personal computer 300.
Figure 24:
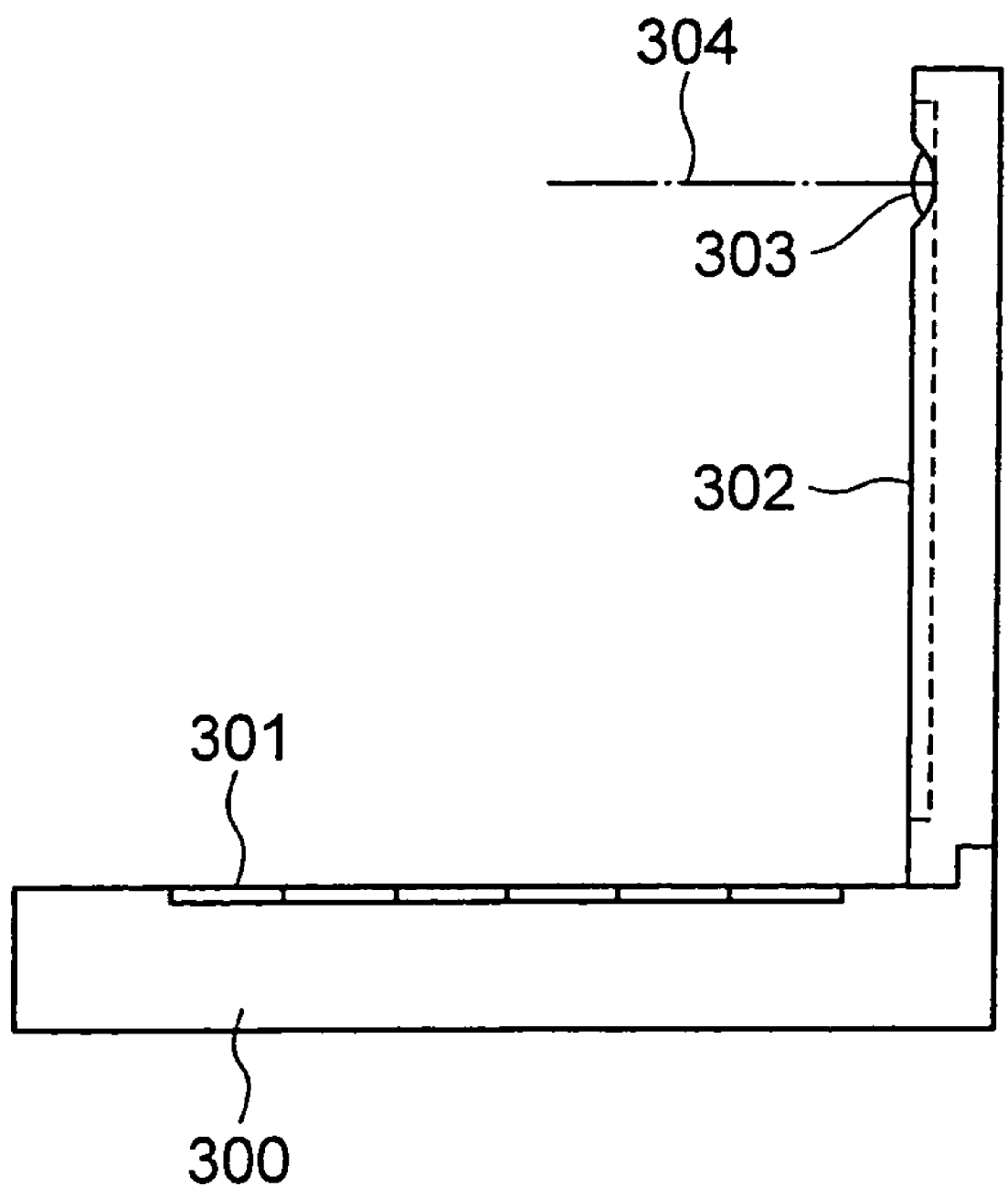
FIG. 24 is a side view of the personal computer 300.

Next, a personal computer which is an example of an information processing apparatus with a built-in image forming system as an objective optical system is shown in FIG. 22 to FIG. 24. FIG. 22 is a frontward perspective view of a personal computer 300 with its cover opened, FIG. 23 is a cross-sectional view of a photographic optical system 303 of the personal computer 300, and FIG. 24 is a side view of FIG. 22. As it is shown in FIG. 22 to FIG. 24, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 40, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 25A:
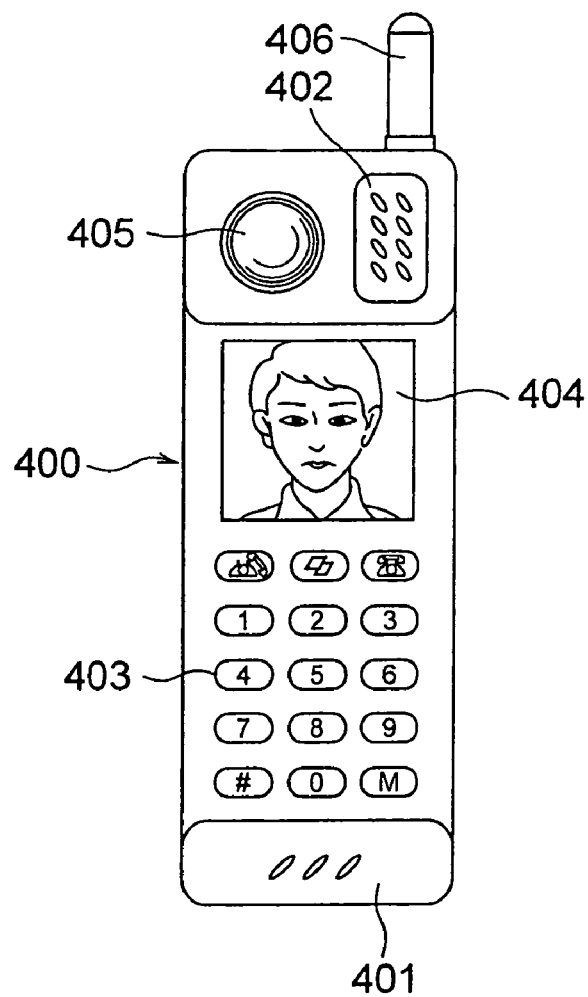
FIG. 25A, FIG. 25B, and FIG. 25C are diagrams showing a mobile telephone which is an example of the information processing apparatus in which, the image forming optical system of the present invention is built-in as a photographic optical system, where.
Figure 25B:
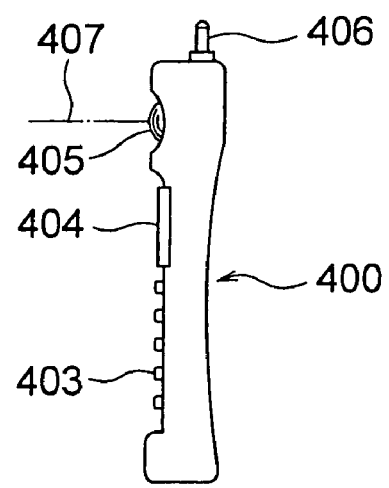
Figure 25C:
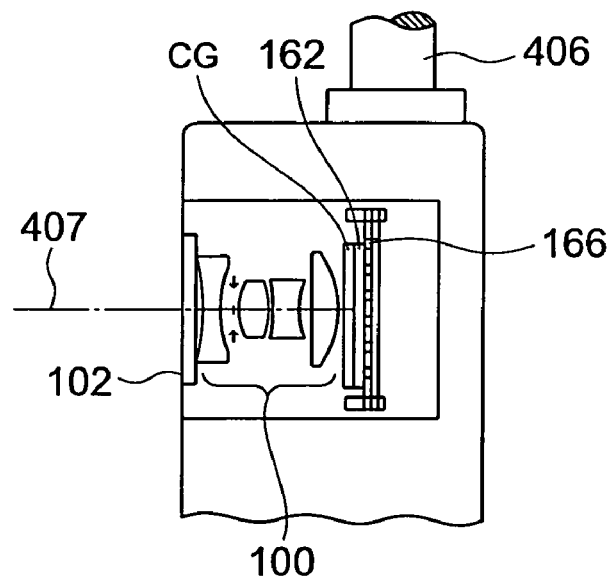

Next, a telephone which is an example of an information processing apparatus in which the image forming optical system of the present invention is built-in as a photographic optical system, particularly a portable telephone which is easy to carry is shown in FIG. 25A, FIG. 25B, and FIG. 25C. FIG. 25A is a front view of a portable telephone 400, FIG. 25B is a side view of the portable telephone 400, and FIG. 25C is a cross-sectional view of a photographic optical system 405. As shown in FIG. 25A to FIG. 25C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

The image forming optical system and the image pickup apparatus according to the present invention show an effect that the image forming optical system, while being an optical system of four lens group having a negative refractive power, a positive refractive power, a negative refractive power and a positive refractive power, it is possible to make a focusing lens group light-weight and simple, and enabling inner focus by the focusing lens, and also it is possible to secure an optical performance favorably from infinity to a close point.

What is claimed is:

1. An image forming optical system comprising in order from an object side:
    a first lens group having a negative refractive power;
    a second lens group having a positive refractive power, which comprises an aperture stop;
    a third lens group having a negative refractive power; and
    a fourth lens group having a positive refractive power, wherein
    the first lens group, in order from the object side, comprises a negative sub-group, and a positive sub-group, and
    the third lens group is a focusing group which comprises only a cemented lens having a convex surface directed toward the object side, of a negative lens and a positive meniscus lens, in order from the object side.

2. The image forming optical system according to claim 1, wherein the image forming optical system satisfies the following conditional expression (1)

$$N_{d3} \leq -0.03 \times v_{d3} + 2.37 \qquad (1)$$

where, $N_{d3}$ denotes a refractive index for a d-line of a glass material of the positive meniscus lens in the third lens group of the image forming optical system, $v_{d3}$ denotes Abbe's number $(nd1-1)/(nF1-nC1)$ with reference to the d-line, for the glass material of the positive meniscus lens in the third lens group of the image forming optical system, and nd1, nC1, and nF1 denote refractive indices of the glass material of the positive meniscus lens in the third lens group for the d-line, a C-line, and an F-line respectively.

3. The image forming optical system according to claim 1, wherein the image forming optical system satisfies the following conditional expression (2)

$$3.3 \leq f_{1T}/F_W \leq 5.8 \qquad (2)$$

where, $f_{1T}$ denotes a focal length of the positive sub-group in the first lens group of the image forming optical system, and
$F_W$ denotes a focal length of the overall optical system at a wide angle end, of the image forming optical system.

4. The image forming optical system according to claim 1, wherein the image forming optical system satisfies the following conditional expression (3)

$$0.375 \leq d_{1T}/d_{G1} \leq 0.52 \qquad (3)$$

where, $d_{1T}$ denotes a distance on an optical axis, between the negative sub-group and the positive sub-group in the first lens group of the image forming optical system, and $d_{G1}$ denotes a distance on the optical axis from a first surface up to a last surface of the first lens group of the image forming optical system.

5. The image forming optical system according to claim 1, wherein the image forming optical system satisfies the following conditional expression (4)

$$0.91 \leq (MG_W \times MG_t)^{1/2} \leq 1.15 \qquad (4)$$

where, $MG_W$ denotes a combined magnification of the image forming optical system from the second lens group onward, at the wide angle end, and $MG_t$ denotes a combined magnification of the image forming optical system from the second lens group onward, at a telephoto end.

6. The image forming optical system according to claim 1, wherein the image forming optical system satisfies the following conditional expression (5)

$$-2.5 \leq (R_{G3b}+R_{G3a})/(R_{G3b}-R_{G3a}) < -1 \qquad (5)$$

where, $R_{G3a}$ denotes a radius of curvature of a surface on the object side, of the cemented lens in the third lens group of the image forming optical system, and $R_{G3b}$ denotes a radius of curvature of a surface on an image side, of the cemented lens in the third lens group of the image forming optical system.

7. The image forming optical system according to claim 1, wherein the image forming optical system satisfies the following conditional expression (6)

$$-1.95 \leq (R_{G3ob}+R_{G3oa})/(R_{G3ob}-R_{G3oa}) < -1 \qquad (6)$$

where, $R_{G3oa}$ denotes a radius of curvature of a surface on the object side, of the negative lens in the third lens group of the image forming optical system, and $R_{G3ob}$ denotes a radius of curvature of a surface on an image side, of the negative lens in the third lens group of the image forming optical system.

8. The image forming optical system according to claim 1, wherein in the fourth lens group, there is at least one lens component which satisfies the following conditional expression (7)

$$-4.5 \leq (R_{G4b}+R_{G4a})/(R_{G4b}-R_{G4a}) \leq -1.2 \qquad (7)$$

where, $R_{G4a}$ denotes a radius of curvature of a surface on the object side, of a lens in the fourth lens group of the image forming optical system, and $R_{G4b}$ denotes a radius of curvature of a surface on an image side, of a lens in the fourth lens group of the image forming optical system.

9. The image forming optical system according to claim 1, wherein in the second lens group of the image forming optical system, there are at least two air lenses having a meniscus shape.

10. The image forming optical system according to claim 9, wherein in the second lens group of the image forming optical system, there is only one lens component between the air lenses having the meniscus shape.

11. The image forming optical system according to claim 9, wherein in the second lens group, the air lens having the meniscus shape has a convex surface directed toward the object side, and satisfies the following conditional expression (8)

$$1.3 \leq |(R_{G2mb}+R_{G2ma})/(R_{G2mb}-R_{G2ma})| \qquad (8)$$

where, $R_{G2ma}$ denotes a radius of curvature of a surface on the object side, of the air lens having the meniscus shape in the second lens group of the image forming optical system, and $R_{G2mb}$ denotes a radius of curvature of a surface on an image side, of the air lens having the meniscus shape in the second lens group of the image forming optical system.

12. The image forming optical system according to claim 1, wherein the aperture stop is farther on the object side of the last surface of the second lens group.

13. The image forming optical system according to claim 1, wherein a position of the fourth lens group is fixed at the time of zooming change.

14. The image forming optical system according to claim 1, wherein a position of the first lens group is fixed at the time of zooming change.

15. An image pickup apparatus comprising:
an image forming optical system according to claim 1; and
an image pickup element.

* * * * *